(12) United States Patent
Mueller et al.

(10) Patent No.: US 12,064,830 B2
(45) Date of Patent: Aug. 20, 2024

(54) SUBSTRATE PERFORATION SYSTEM AND METHOD USING BEAMLETS

(71) Applicant: ROHR, INC., Chula Vista, CA (US)

(72) Inventors: Arabella Mueller, Redlands, CA (US); Angel Cabrera, Fullerton, CA (US); Fassil Ghebremichael, Irvine, CA (US); Charles Novak, Perris, CA (US); Dominic J. Elliott, Riverside, CA (US); Andrew Adan, Corona, CA (US)

(73) Assignee: ROHR, INC., Chula Vista, CA (US)

( * ) Notice: Subject to any disclaimer, the term of this patent is extended or adjusted under 35 U.S.C. 154(b) by 223 days.

(21) Appl. No.: 16/817,147

(22) Filed: Mar. 12, 2020

(65) Prior Publication Data

US 2021/0283719 A1    Sep. 16, 2021

(51) Int. Cl.
*B23K 26/38* (2014.01)
*B23K 26/04* (2014.01)
*B23K 26/067* (2006.01)

(52) U.S. Cl.
CPC ............ *B23K 26/38* (2013.01); *B23K 26/04* (2013.01); *B23K 26/0673* (2013.01); *B23K 26/0676* (2013.01)

(58) Field of Classification Search
CPC ...... B23K 26/04; B23K 26/067; B23K 26/38; B23K 26/0673; B23K 26/0676; B23K 26/082; B23K 26/0821; B23K 26/382; B23K 26/40; B23K 26/402; B23K 2103/172; B23K 2103/52; B01D 39/00; B01D 39/14; B01D 39/16; D04H 1/4291; D04H 1/724; D06M 10/00; D06M 101/00; D06M 101/16; D06M 101/18; D06M 101/20; D06M 101/22
See application file for complete search history.

(56) References Cited

U.S. PATENT DOCUMENTS

| 4,439,663 | A |   | 3/1984  | Lilly, Jr. et al. |
| 5,055,653 | A |   | 10/1991 | Funami et al. |
| 5,674,414 | A | * | 10/1997 | Schweizer ........... G02B 27/143 219/121.77 |
| 5,676,866 | A | * | 10/1997 | in den Baumen . B23K 26/0673 219/121.77 |

(Continued)

FOREIGN PATENT DOCUMENTS

| CA | 2978123       |   | 3/2019 |              |
| EP | 2352618 B1    | * | 6/2019 | ... B23K 26/032 |

(Continued)

OTHER PUBLICATIONS

European Patent Office, European Search Report dated Sep. 8, 2021 in Application No. 21162124.8.

*Primary Examiner* — Dana Ross
*Assistant Examiner* — Adam M Eckardt
(74) *Attorney, Agent, or Firm* — SNELL & WILMER L.L.P.

(57) ABSTRACT

A perforation system is disclosed that utilizes an optical beamlet generator and a scanner (e.g., at least two moveable mirrors). The optical beamlet generator may be a lenslet array or a diffractive optical element. The optical beamlet generator outputs a plurality of beamlets from a single input laser beam. These beamlets are moved in at least two dimensions relative to a surface of a substrate to form perforations in the substrate.

20 Claims, 20 Drawing Sheets

(56) References Cited

U.S. PATENT DOCUMENTS

| | | | |
|---|---|---|---|
| 6,515,257 B1* | 2/2003 | Jain | B23K 26/382 |
| | | | 219/121.73 |
| 6,625,181 B1* | 9/2003 | Oshemkov | B23K 26/082 |
| | | | 219/121.68 |
| 6,635,849 B1 | 10/2003 | Okawa et al. | |
| 6,720,524 B1* | 4/2004 | Hamada | H05K 3/0026 |
| | | | 219/121.7 |
| 6,800,237 B1 | 10/2004 | Yamamoto et al. | |
| 6,818,858 B2 | 11/2004 | Yasoda et al. | |
| 7,924,488 B2* | 4/2011 | Broome | G02B 26/12 |
| | | | 359/205.1 |
| 8,394,085 B2 | 3/2013 | Horikawa et al. | |
| 8,415,585 B2 | 4/2013 | Sercel et al. | |
| 9,648,698 B2* | 5/2017 | Raz | G02B 26/127 |
| 9,855,626 B2 | 1/2018 | Tiwari et al. | |
| 9,950,392 B2 | 4/2018 | Tiwari et al. | |
| 10,615,044 B1* | 4/2020 | Vázquez-Córdova | |
| | | | B23K 26/38 |
| 10,732,439 B2* | 8/2020 | Kliner | B23K 26/067 |
| 2005/0056626 A1* | 3/2005 | Gross | B23K 26/067 |
| | | | 219/121.77 |
| 2005/0259709 A1* | 11/2005 | Das | B23K 26/0622 |
| | | | 372/55 |
| 2006/0001878 A1* | 1/2006 | Das | B23K 26/0006 |
| | | | 356/400 |
| 2007/0075063 A1* | 4/2007 | Wilbanks | B23K 26/40 |
| | | | 219/121.85 |
| 2010/0140237 A1* | 6/2010 | Unrath | B23K 26/082 |
| | | | 219/121.72 |
| 2010/0291760 A1* | 11/2010 | Doudoumopoulos | |
| | | | B23K 26/0622 |
| | | | 257/E21.134 |
| 2011/0132549 A1* | 6/2011 | Sercel | B23K 26/40 |
| | | | 156/753 |
| 2015/0038313 A1* | 2/2015 | Hosseini | B23K 26/0648 |
| | | | 219/121.75 |
| 2016/0243646 A1* | 8/2016 | Kleinert | B23K 26/0853 |
| 2018/0360657 A1* | 12/2018 | Bor | G02B 27/1086 |
| 2019/0001442 A1* | 1/2019 | Unrath | B23K 26/082 |
| 2019/0151993 A1* | 5/2019 | Subkhangulov | B23K 26/0643 |
| 2019/0168340 A1* | 6/2019 | Henrottin | B23K 26/323 |
| 2019/0283177 A1* | 9/2019 | Kakizaki | |
| 2019/0314934 A1* | 10/2019 | Sercel | B23K 26/38 |
| 2019/0351511 A1* | 11/2019 | Ryu | G02B 27/28 |
| 2020/0114473 A1* | 4/2020 | Hyakumura | B23K 26/0673 |
| 2020/0316722 A1* | 10/2020 | Verburg | B23K 26/083 |
| 2020/0361038 A1* | 11/2020 | Takechi | B23K 26/21 |
| 2021/0031308 A1* | 2/2021 | Nara | B23K 26/402 |
| 2021/0107091 A1* | 4/2021 | Riechel | B23K 26/0624 |
| 2021/0138581 A1* | 5/2021 | Cho | B23K 26/354 |
| 2021/0162546 A1* | 6/2021 | Xin | B23K 26/0613 |
| 2021/0229215 A1* | 7/2021 | Weston | B22F 12/44 |
| 2021/0245297 A1* | 8/2021 | Ohtani | B23K 26/57 |
| 2021/0268607 A1* | 9/2021 | Okuma | B23K 26/0648 |
| 2021/0283719 A1* | 9/2021 | Mueller | B23K 26/04 |
| 2021/0286172 A1* | 9/2021 | Mueller | G02B 26/121 |
| 2021/0372881 A1* | 12/2021 | Walters | G01N 29/043 |

FOREIGN PATENT DOCUMENTS

| | | |
|---|---|---|
| JP | 2008298224 | 12/2008 |
| JP | 2012104679 | 5/2012 |

* cited by examiner

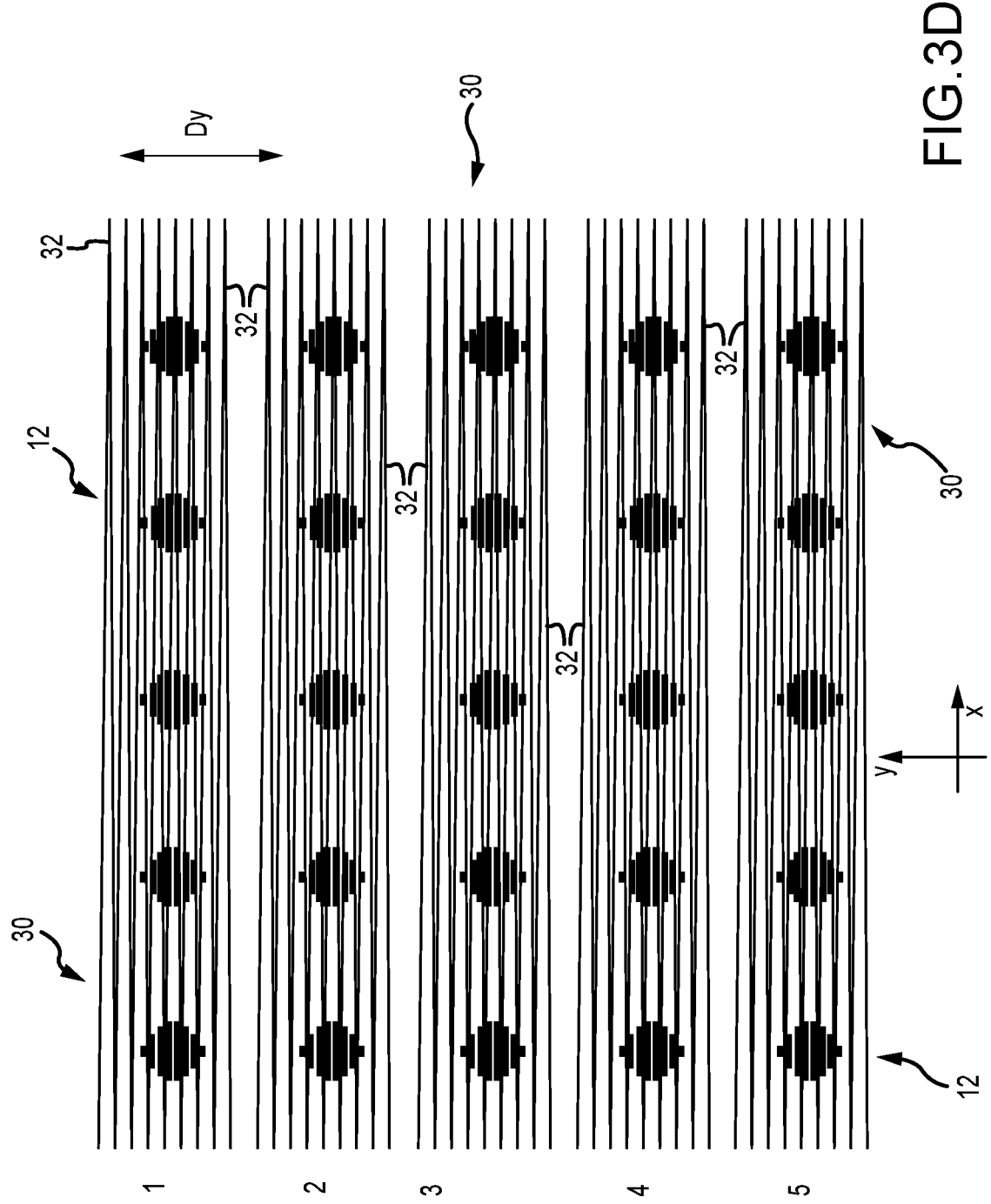

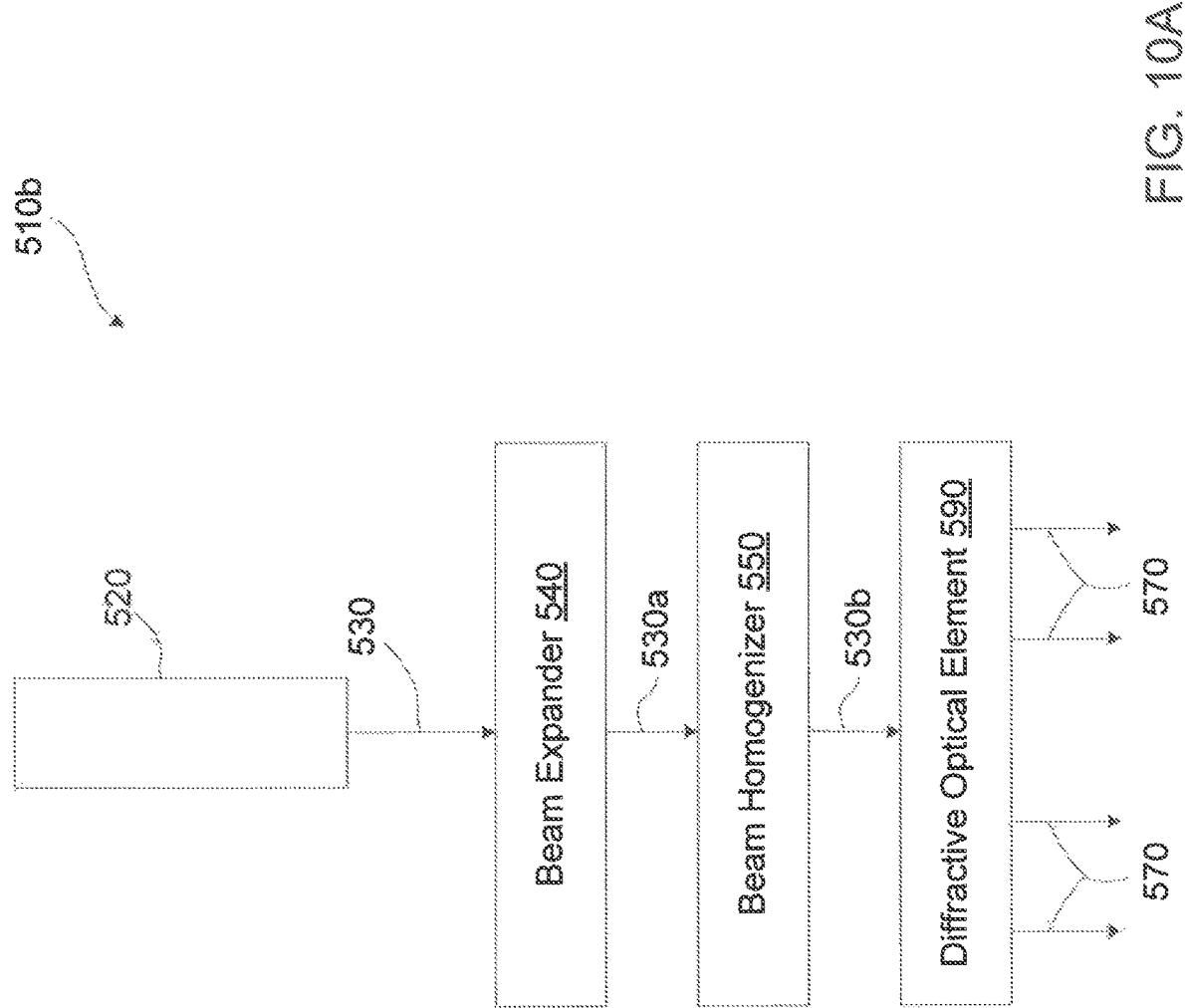

SUBSTRATE PERFORATION SYSTEM AND METHOD USING BEAMLETS

FIELD

The present disclosure generally relates to the field of processing substrates and, more particularly, to creating perforations in a substrate.

BACKGROUND

Prior technology with laser/scanner perforation on aerostructures materials utilizes a combination of n lasers in conjunction with a galvo-based x-y scanner. Although control of beam direction can be realized with the x-y scanners, it comes at speeds that are much slower than are desired for use in connection with aerostructure production. In a standard two galvanometer mirror system, the mirrors are commanded to some position and the laser is made to emit light. Although flexible in terms of pointing control in two planes, and adequate for many applications, this configuration yields a relatively slow process for creating perforations for aerostructures.

SUMMARY

Various perforation systems are presented herein. Both the configuration of such a perforation system and the operational characteristics of such a perforation system are within the scope of this Summary.

A perforation system may include a laser system and a scanner. The laser system may include a laser and an optical beamlet generator. The laser system may be configured to input a laser beam (e.g., collimated) to the optical beamlet generator, which then outputs a plurality of beamlets. The scanner (e.g., at least a first movable mirror and a second movable mirror) is configured to simultaneously direct beamlets from the optical beamlet generator toward a substrate and to simultaneously move the plurality of beamlets relative to the substrate in first and second dimensions that are orthogonal to one another. Each beamlet defines a two-dimensional perforation on a surface of the substrate through operation of the scanner. An optical path may be characterized as proceeding from the laser to the substrate on which perforations are formed.

The optical beamlet generator may be in the form of a lenslet array or a diffractive optical element. The laser system may include a beam expander, a beam homogenizer, or both. The beam expander may be located between the laser and the optical beamlet generator proceeding along the noted optical path. The beam homogenizer may be located between the beam expander and the optical beamlet generator proceeding along the noted optical path. The optical beamlet generator may be located between the beam homogenizer and the scanner proceeding along the noted optical path.

The perforation system may further include a movable base (e.g., rotatable), which in turn may include a plurality of optical beamlet generators. Each optical beamlet generator may be movable into alignment with the noted optical path by movement of the base. At least one of the optical beamlet generators may be detachably connectable with the base. At least two of the optical beamlet generators may be of a different configuration (e.g., to output a different number of beamlets, a different arrangement/pattern of beamlets, or both).

Any feature of any other various aspects that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that a perforation system includes "a lenslet array" alone does not mean that the perforation system includes only a single lenslet array). Moreover, any failure to use phrases such as "at least one" also does not limit the corresponding feature to the singular (e.g., indicating that a perforation system includes "a lenslet array" alone does not mean that the perforation system includes only a single lenslet array). Use of the phrase "at least generally" or the like in relation to a particular feature encompasses the corresponding characteristic and insubstantial variations thereof (e.g., indicating that a mirror surface is at least substantially flat encompasses the mirror surface being flat). Finally, a reference of a feature in conjunction with the phrase "in one embodiment" does not limit the use of the feature to a single embodiment.

Various aspects are also addressed by the following paragraphs and in the noted combinations:

1. In one embodiment, a perforation system, comprising:
   a laser system comprising a laser and an optical beamlet generator, wherein said laser system is configured to output a laser beam to said optical beamlet generator, from which said optical beamlet generator outputs a plurality of beamlets; and
   a scanner configured to simultaneously direct said plurality of beamlets from said optical beamlet generator toward a substrate and to simultaneously move said plurality of beamlets relative to the substrate in first and second dimensions that are orthogonal to one another, wherein each beamlet of said plurality of beamlets simultaneously defines a two-dimensional perforation on a surface of the substrate by operation of said scanner, and wherein an optical path extends from said laser to the substrate.

In another embodiment, said laser outputs a collimated laser beam.

In another embodiment, said laser system further comprises a beam expander.

In another embodiment, said beam expander is located between said laser and said optical beamlet generator proceeding along said optical path.

In another embodiment, said laser system further comprises a beam homogenizer.

In another embodiment, said beam homogenizer is located between said beam expander and said optical beamlet generator proceeding along said optical path.

In another embodiment, said optical beamlet generator is located between said beam homogenizer and said scanner proceeding along said optical path.

In another embodiment, said scanner comprises a first movable mirror and a second movable mirror.

In another embodiment, said first movable mirror controls an impact location of said plurality of beamlets on the substrate in said first dimension, and said second movable mirror controls an impact location of said plurality of beamlets on the substrate in said second dimension.

In another embodiment, further comprising:
   a movable base, wherein said base comprises a plurality of said optical beamlet generators, wherein each said optical beamlet generator is separately movable into alignment with said optical path by movement of said base.

In another embodiment, at least some of said optical beamlet generators are of a different configuration.

In another embodiment, at least one of said optical beamlet generators is detachably connected with said base.

In another embodiment, each said optical beamlet generator incorporated by said base is detachably connected with said base.

In another embodiment, said optical beamlet generator comprises a lenslet array.

In another embodiment, said lenslet array comprises a plurality of lenslets.

In another embodiment, said lenslet array generates and outputs said plurality of beamlets.

In another embodiment, further comprising:
a movable base, wherein said base comprises a plurality of said lenslet arrays, wherein each said lenslet array is separately movable into alignment with said optical path by movement of said base.

In another embodiment, at least some of said lenslet arrays are of a different configuration.

In another embodiment, each said lenslet array comprises at least one lenslet.

In another embodiment, each said lenslet array comprises a different number of said at least one lenslet.

In another embodiment, each said lenslet array utilizes a different arrangement of said at least one lenslet.

In another embodiment, at least one of said lenslet arrays is detachably connected with said base.

In another embodiment, each said lenslet array incorporated by said base is detachably connected with said base.

In another embodiment, said optical beamlet generator comprises a diffractive optical element.

In another embodiment, said diffractive optical element generates and outputs said plurality of beamlets.

In another embodiment, further comprising:
a movable base, wherein said base comprises a plurality of said diffractive optical elements, wherein each said diffractive optical element is separately movable into alignment with said optical path by movement of said base.

In another embodiment, at least some of said diffractive optical elements are of a different configuration to provide at least one difference in relation to said plurality of beamlets that are output from a corresponding said diffractive optical element.

In another embodiment, at least one of said diffractive optical elements is detachably connected with said base.

In another embodiment, each said diffractive optical element incorporated by said base is detachably connected with said base.

In one embodiment, a method of forming a perforation on a substrate, comprising:
generating a plurality of beamlets from a laser beam;
directing said plurality of beamlets to a scanner;
operating said scanner to simultaneously contact said plurality of beamlets with said substrate at a plurality of different locations on a substrate within a first dimension and in a second dimension that is orthogonal to said first dimension; and
forming a plurality of perforations on said substrate using said operating step.

In another embodiment, said generating step comprises directing said laser beam to a lenslet array.

In another embodiment, said lenslet array comprises a plurality of lenslets, and wherein each lenslet outputs a corresponding beamlet.

In another embodiment, said generating step comprises directing said laser beam to a diffractive optical element.

In another embodiment, each beamlet defines a different perforation on said substrate from said operating step.

In another embodiment, a base comprises a plurality of optical beamlet generators, said method further comprising:
moving said base to dispose a first optical beamlet generator of said base in an optical path of said laser beam, wherein said generating step comprises directing said laser beam through said first optical beamlet generator.

In another embodiment, said generating step comprises using said first optical beamlet generator to form a first plurality of perforations on a first region of said substrate by said operating step.

In another embodiment, further comprising:
moving said base to dispose a second optical beamlet generator of said base in said optical path of said laser beam, wherein said generating step comprises directing said laser beam through said second optical beamlet generator to form a second plurality of perforations in the same said first region of said substrate by said operating step.

In another embodiment, further comprising:
moving said base to dispose a second optical beamlet generator of said base in said optical path of said laser beam, wherein said generating step comprises directing said laser beam through said second optical beamlet generator to form a second plurality of perforations outside of said first region of said substrate by said operating step.

In another embodiment, said laser beam is a collimated laser beam.

BRIEF DESCRIPTION OF THE FIGURES

FIG. 3D shows a representative scanning configuration for forming at least generally circular perforations on a substrate using the perforation system of FIG. 3A;

FIG. 9A is a schematic of a laser system that may be used by the perforation system of FIG. 8, where this laser system utilizes a lenslet array;

FIG. 10A is a schematic of a laser system that may be used by the perforation system of FIG. 8, where this laser system utilizes a diffractive optical element.

DETAILED DESCRIPTION

Figure 1A:
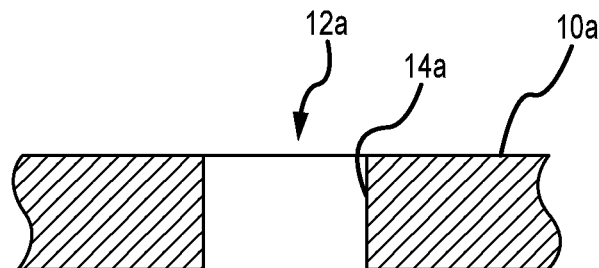
FIG. 1A is a cross-sectional view of a substrate with a perforation in the form of a through-hole.
Figure 1B:
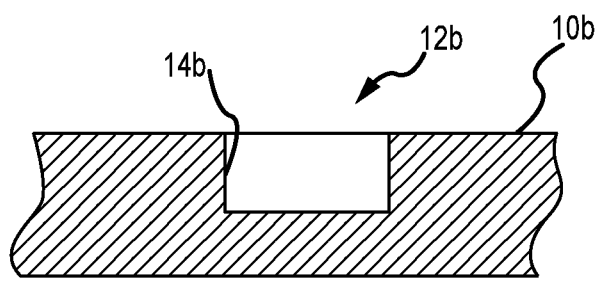
FIG. 1B is a cross-sectional view of a substrate with a perforation in the form of a recess or blind hole.
Figure 1C:
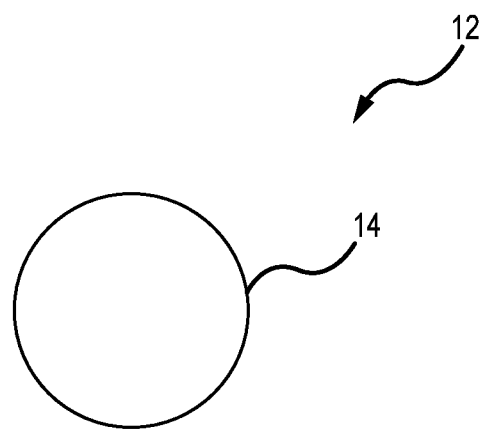
FIG. 1C is a plan view of representative perforation with a circular perimeter or perimeter configuration.

Various embodiments of perforation systems are disclosed herein that may be configured/operated to form one or more perforations on a substrate of any appropriate configuration (e.g., substrate in the form of a plate or plate-like structure; a substrate in the form of a curved structure), on a substrate formed from any appropriate material or combination of materials (e.g., a composite, CFRP (carbon fiber reinforced polymer), CMC (ceramic matrix composite), GFRP (glass fiber reinforced polymer), metal, alloys, ceramics), and including all combinations thereof. These perforations may be of any desired perimeter configuration (e.g., a shape or profile of the perforation in a plan view) and/or size. FIG. 1A illustrates a substrate 10a having such a perforation 12a in the form of a through-hole (i.e., the perforation 12a extends completely through the substrate 10a), where this perforation 12a has a perimeter 14a that defines the perimeter configuration of the perforation 12a. FIG. 1B illustrates a substrate 10b having such a perforation 12b in the form of a recess or blind hole (i.e., the perforation 12b fails to extend completely through the substrate 10b, so the perforation 12b instead defines a concave recess on a surface of the substrate 10b), where this perforation 12b has a perimeter 14b that defines the perimeter configuration of the perforation 12b. FIG. 1C is a plan view of a perforation 12 having a circular perimeter 14, and that may be utilized for the perforation 12a of FIG. 1A or the perforation 12b of FIG. 1B.

Figure 1D:
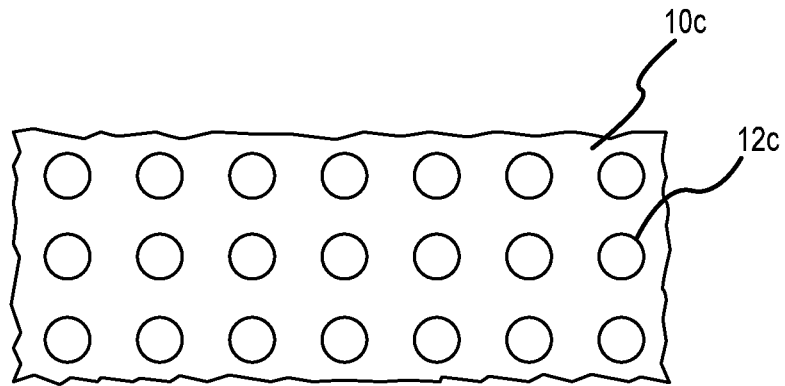
FIG. 1D is a plan view of a portion of a substrate with a plurality of perforations of one representative perimeter configuration or perforation profile.
Figure 1E:
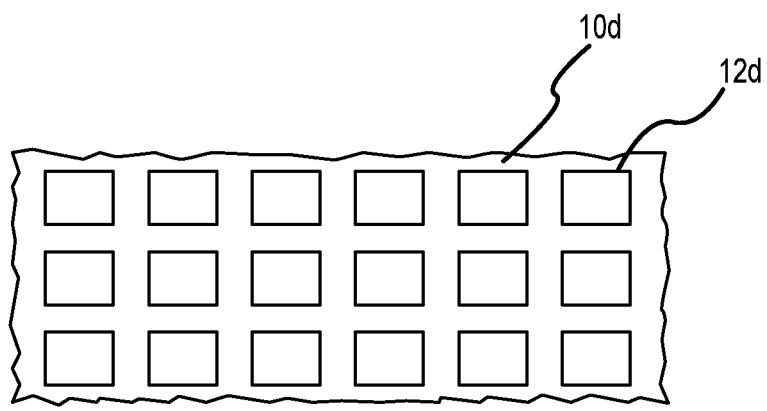
FIG. 1E is a plan view of a portion of a substrate with a plurality of perforations of another representative perimeter configuration or perforation profile.

The embodiments of perforation systems disclosed herein may be configured/operated to form any appropriate number of perforations on a substrate, in any appropriate layout/arrangement, and with any appropriate spacing between adjacent pairs of perforations. Representative layouts/arrangements of perforations that may be formed by the embodiments of perforation systems disclosed herein are illustrated in FIGS. 1D and 1E. The substrate 10c of FIG. 1D includes a plurality of circular perforations 12c that are disposed in a plurality of rows that are spaced from one another. The substrate 10d of FIG. 1E includes a plurality of square perforations 12d that are disposed in a plurality of rows that are spaced from one another. Any appropriate spacing between adjacent pairs of perforations in a given row may be utilized, including a common spacing between adjacent pairs of perforations throughout a given row. The same or a different spacing between adjacent pairs of perforations may be utilized in one or more rows.

Perforations formed by any of the embodiments of perforation systems disclosed herein may provide any appropriate function or combination of functions. Representative functions for these perforations on a surface of a substrate include without limitation addressing acoustics (dampening) (the addition of perforations to a surface of a substrate may be characterized as an acoustic treatment of the substrate), addressing aerodynamic drag (e.g., improving laminar flow), surface conditioning (e.g., to enhance bonding, to enhance hydrophobic properties), cutting, trimming, welding, and the like. One application for the embodiments of perforation systems disclosed herein is to create perforations on a substrate that is used as an aerostructure (e.g., a component of an airframe for an aircraft; an exterior surface of an aerostructure).

Figure 2A:
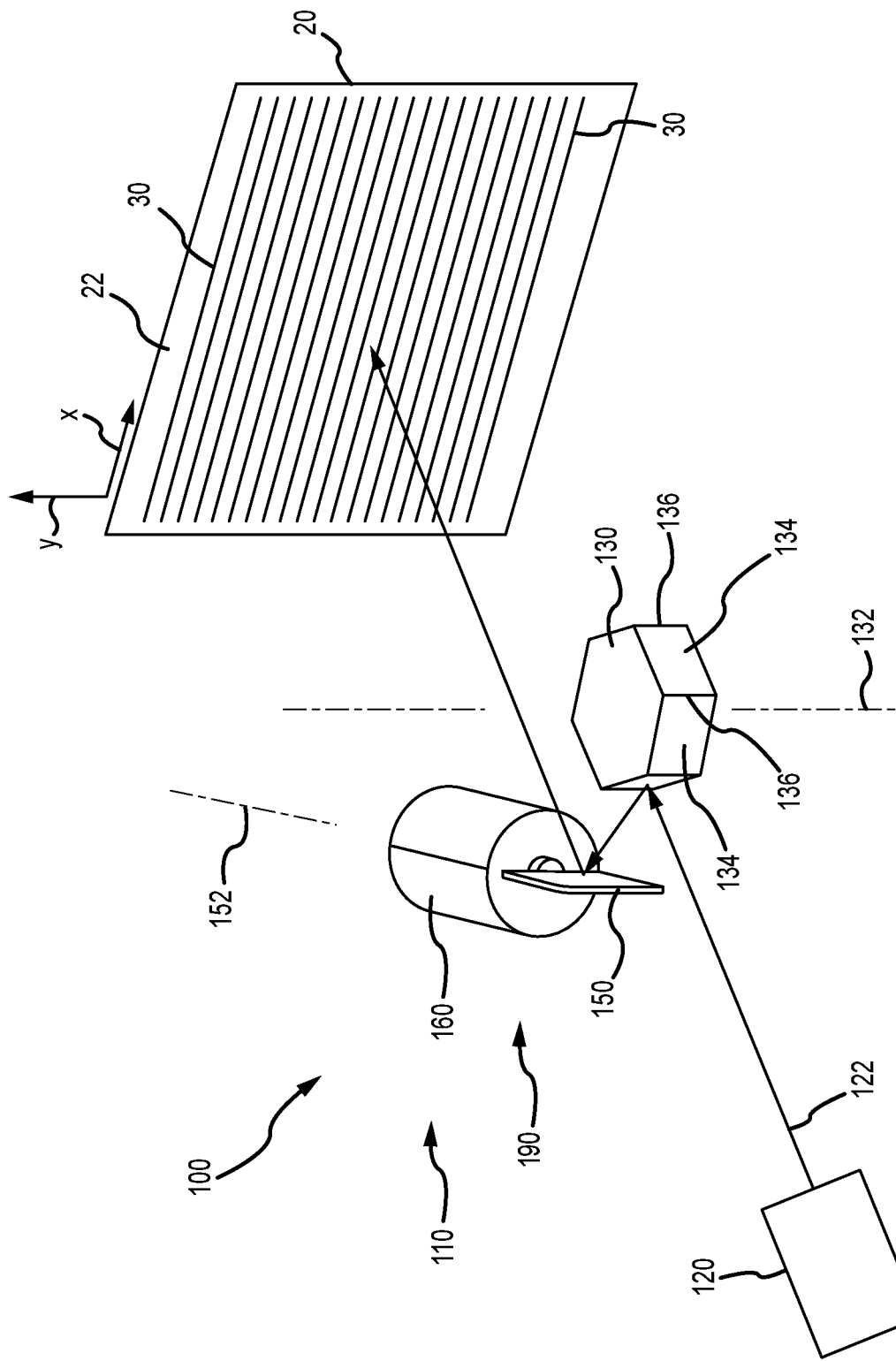
FIG. 2A is a schematic of a perforation system that utilizes an optical system having a rotatable polygon mirror to define a plurality of perforations on a substrate.

A perforation system in accordance with various embodiments is illustrated in FIG. 2A, is identified by reference numeral 100, and is configured/operated to form a plurality of perforations of a predetermined perimeter configuration and size on a surface 22 of a substrate 20 in accordance with the foregoing. The perforation system 100 may be characterized as including an optical system 110. Components of this optical system 110 include a laser 120, a first polygon mirror 130, and a mirror 150. The first polygon mirror 130 and mirror 150 may be characterized as a scanner 190.

The laser 120 may be of any appropriate type/configuration, of any appropriate pulse repetition rate, pulse width, power, and wavelength (e.g., YAG; 100 kHz, 10 ns, 100 W, 1064 nm), and generates a laser beam 122 that proceeds along an optical path to the substrate 20. The laser beam 122 may be output by the laser 120 in the form of a pulse that is issued at any appropriate frequency (e.g., a fixed frequency). One or more embodiments has the position of the laser 120 being fixed relative to the first polygon mirror 130—more specifically the position of the laser 120 may be fixed relative to the position of a rotational axis 132 of the first polygon mirror 130. The impacting of the laser beam 122 on the surface 22 of the substrate 20 removes corresponding material from the substrate 20 (e.g., via ablation, vaporization, or the like of the material defining the substrate 20).

The first polygon mirror 130 may be disposed between the laser 120 and the mirror 150 along the optical path of the laser beam 122 proceeding from the laser 120 to the substrate 20, although both the first polygon mirror 130 and the 150 mirror may be disposed at any appropriate position along the noted optical path. Operation of the perforation system 100 may include continuously rotating the first polygon mirror 130 at a constant rotational velocity about its rotational axis 132 (e.g., an appropriate rotational drive may be interconnected with the first polygon mirror 130). A plurality of faces 134 are disposed on a perimeter of the first polygon mirror 130. Any appropriate number of faces 134 may be disposed on the perimeter of the first polygon mirror 130 (six in the illustrated embodiment). Each of these faces 134 are flat or planar surfaces in one or more embodiments. Moreover, these faces 134 are each disposed at least substantially parallel to the rotational axis 132 of the first polygon mirror 130 for the case of the perforation system 100. As such, a vector 140 that is normal to its corresponding face 134 is parallel to or colinear with the same vector 140 of each other face 134 of the first polygon mirror 130 when disposed in the same rotational or angular position relative to the rotational axis 132.

Figure 2B:
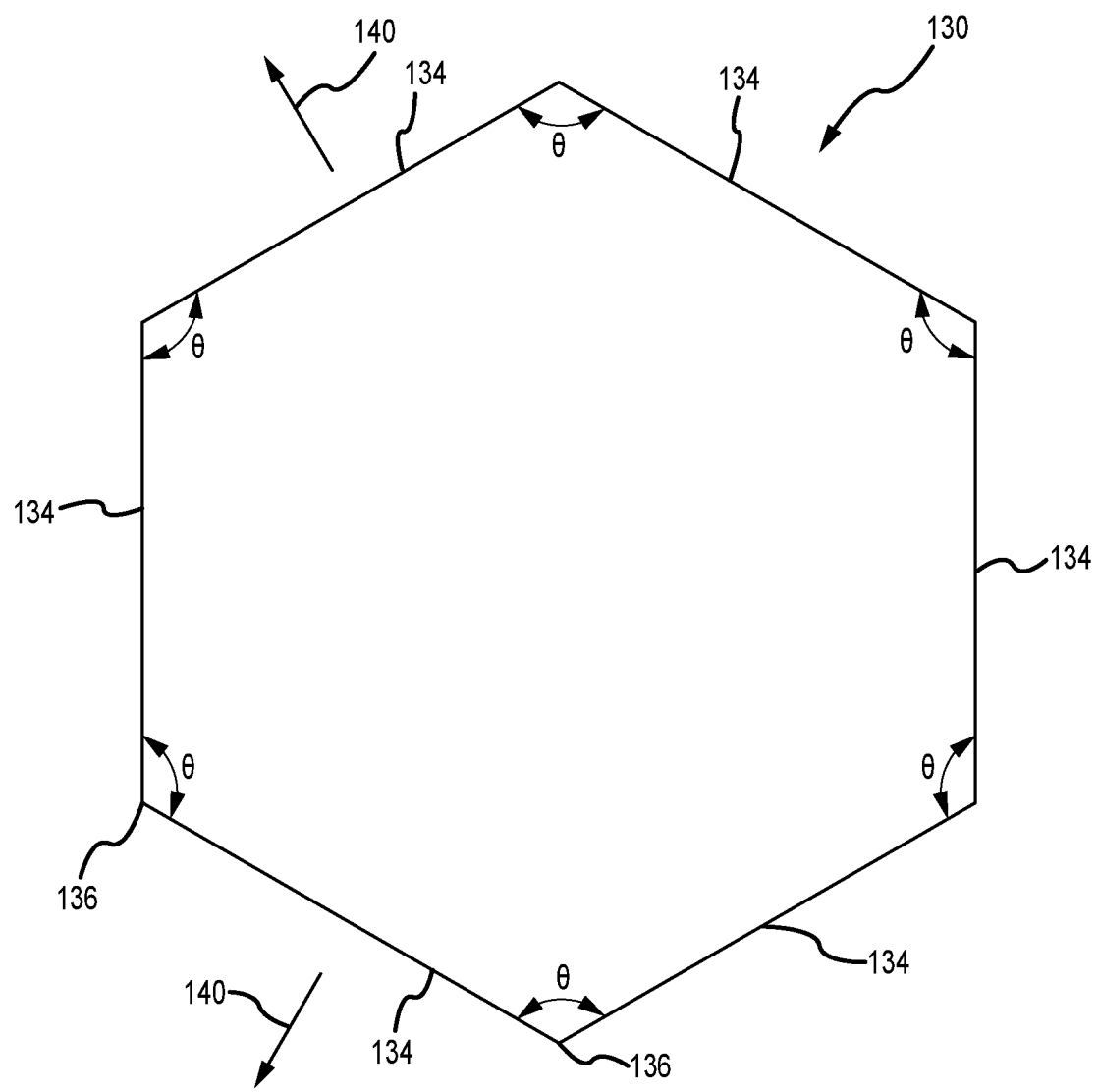
FIG. 2B is a top view of the polygon mirror used by the perforation system of FIG. 2A.

A common included angle θ exists between each adjacent pair of faces 134 of the first polygon mirror 130 (e.g., FIG. 2B). Although adjacent faces 134 may intersect along a line, any appropriate transition may be used between each adjacent pair of faces 134 (e.g., a chamfer; a rounded or convex transition surface). Where the laser beam 122 impacts a given face 134 between its corresponding pair of ends 136 (the spacing between a pair of adjacent ends 136 may be referred to as defining a length dimension of the corresponding face 134) will determine where the laser beam 122 impacts the surface 22 of the substrate 20 in the x dimension noted in FIG. 2A.

The mirror 150 may be disposed between the first polygon mirror 130 and the substrate 20 along the optical path of the laser beam 122 proceeding from the laser 120 to the substrate 20, but again the mirror 150 may be disposed at any appropriate position along the noted optical path. The position of the mirror 150 is controlled by a drive 160 (e.g., a servomotor or a galvanometer) that rotates the mirror 150 about a rotational axis 152. The mirror 150 may be referred to as a galvanometer mirror or scanner 150. In any case, the position of the mirror 150 controls where the laser beam 122 impacts the surface 22 of the substrate 20 in the y dimension noted in FIG. 2A. One or more other optical components may be located along the optical path between the mirror 150 and the substrate 20, for instance such that the laser beam 122 impacts the substrate 20 normal to its surface 22.

Figure 2C:
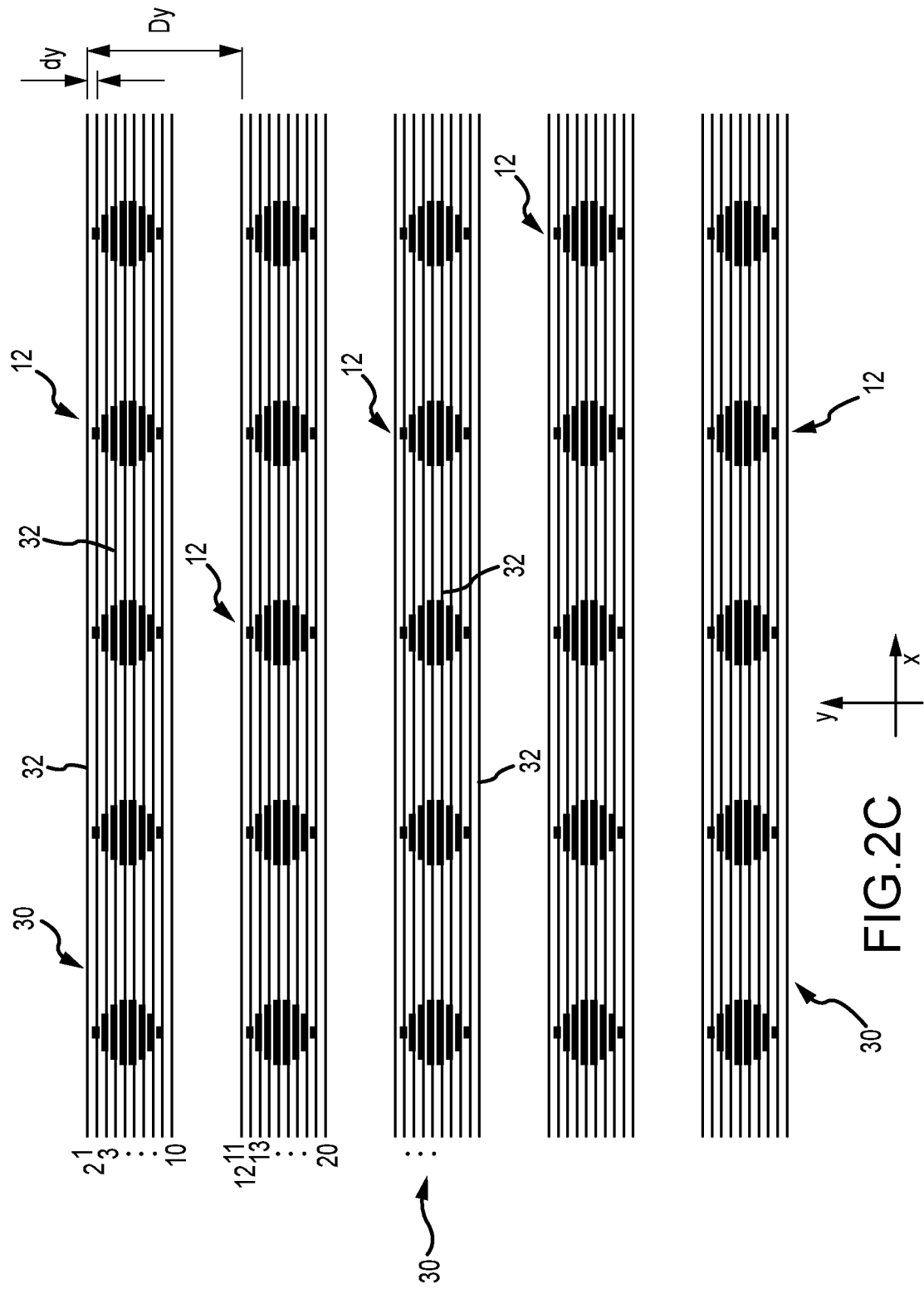
FIG. 2C shows a representative scanning configuration for forming at least generally circular perforations on a substrate using the perforation system of FIG. 2A.

Operation of the perforation system 100 will be addressed with regard to FIGS. 2A and 2C. FIG. 2A shows a plurality of row sets 30 that extend in the x dimension and that are spaced from one another in the y dimension (e.g., the plurality of row sets 30 may be disposed in parallel relation to one another). Each row set 30 may be characterized as including a plurality of rows 32 that also extend in the x dimension and that are spaced from one another in the y dimension (e.g., the plurality of rows 32 may be disposed in parallel relation to one another). Generally and as shown in FIG. 2C, the laser 120 may be activated such that its laser beam 122 impacts the surface 22 of the substrate 20 at each of the locations shown in FIG. 2C to define a plurality of perforations 12 in each row set 30, where each of these perforations 12 will ultimately have a predetermined perimeter configuration, and where the perforations 12 in each row set 30 are spaced from one another in any appropriate fashion (e.g., an equally spaced relation within the given row set 30).

Generally, the mirror 150 may be moved to a fixed position where the laser beam 122 will impact the surface 22 of the substrate 20 along one of the rows 32 (or between an adjacent pair of rows 32) of a particular row set 30. The laser 120 will be pulsed such that it impacts the surface 22 of the substrate 20 at predetermined locations along the given row 32 (or in the x dimension) to define a corresponding portion of each of the perforations 12, and that is achieved by the laser beam 122 being reflected from a face 134 of the first polygon mirror 130 as it is being rotated at a constant rotational speed about its rotational axis 132. Again, the location of where the laser beam 122 impacts a face 134 of the first polygon mirror 130 (e.g., where the laser beam 122 impacts a face 134 along its length dimension), determines where the laser beam 122 impacts the surface 22 of the substrate 20 in the x dimension. The mirror 150 may be incremented between a number of different fixed positions such that the laser beam 122 will impact the surface 22 of the substrate 20 along each of the rows 32 (or between each of the rows 32) of a particular row set 30 to define each of the desired perforations 12 in this row set 30 and where each perforation 12 will ultimately have a predetermined perimeter configuration.

One way in which the perforations 12 shown in FIG. 2C may be produced will be summarized. The mirror 150 may be positioned such that the laser beam 122 will impact the surface 22 of the substrate 20 on the second row 32 (the second down from the top in the view of FIG. 2C) of the upper row set 30 in the view of FIG. 2C. With the mirror 150 remaining in this fixed position, the laser 120 may be pulsed and reflected by one or more faces 134 of the rotating first polygon mirror 130 to impact the surface 22 of the substrate 20 at the locations shown in FIG. 2C (these locations being spaced from one another in the x dimension but occupying the same position in the y dimension). This may be repeated a plurality of times in order for each of the perforations 12 to extend to the desired depth within the substrate 20 (including for a given perforation 12 to extend through the entire thickness of the substrate 20). Thereafter, the mirror 150 may be incremented/moved to a position where the laser beam 122 will impact the surface 22 of the substrate 20 on the next row 32 proceeding in the y dimension (e.g., to another location in the y dimension). With the mirror 150 remaining in this new fixed position, again the laser 120 may be pulsed and reflected by one or more faces 134 of the rotating first polygon mirror 130 to impact the surface 22 of the substrate 20 at the locations shown in FIG. 2C (these locations being spaced from one another in the x dimension but occupying the same position in the y dimension). This may be repeated until each of the perforations 12 in the row set 30 have been defined, and also may be repeated for each row set 30 in which one or more perforations 12 are to be defined.

Based upon the foregoing, it should be appreciated that the mirror 150 is moved in increments dy to form the desired perforations 12 in a particular row set 30, and is moved in a larger increment Dy to move from one row set 30 to an adjacent row set 30. Although the perforation system 100 may be operated to scan or sequence in a top-to-down fashion in the view shown in FIG. 2C, and where the entire depth of each perforation in a given row 32 may be defined prior to proceeding to the next row 32 in the same row set 30 (or more generally to another location in the y dimension), other operational configurations may be utilized. For instance, perforations 12 may be partially defined in each row 32 of a given row set 30, although this would require more incremental movements of the mirror 150 (e.g., ½ of the desired perforation depth for each perforation 12 in a given row set 30 may be defined by a first set of incremental movements of the mirror 150, and this may then be repeated to define the remainder of the desired perforation depth for each perforation in this same row set 30), and this may apply to each row set 30.

Figure 3A:
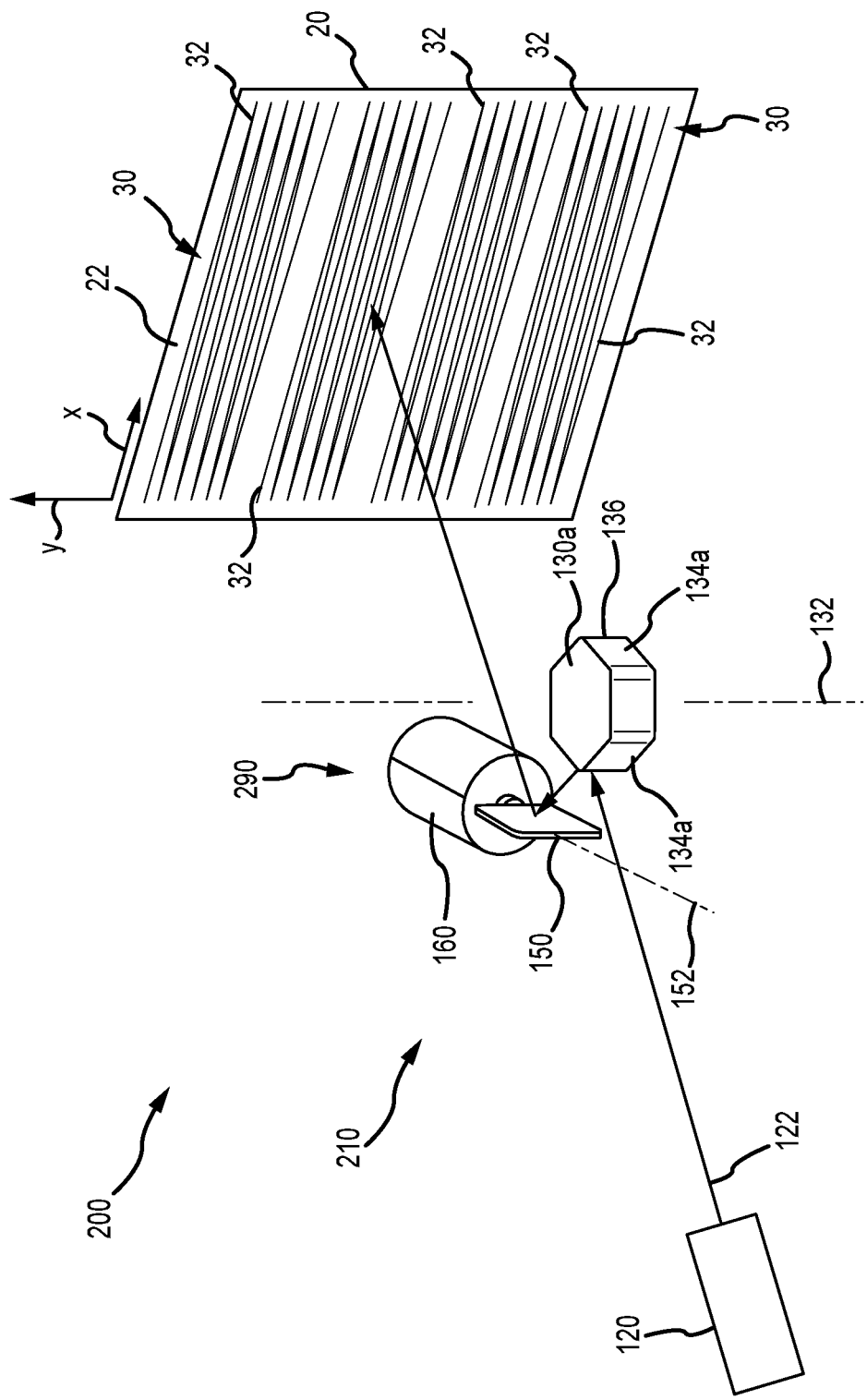
FIG. 3A is a schematic of a perforation system that utilizes an optical system having a rotatable polygon mirror to define a plurality of perforations on a substrate.

A perforation system in accordance with various embodiments is illustrated in FIG. 3A, is identified by reference numeral 200, and is configured/operated to form a plurality of perforations of a predetermined perimeter configuration and size on a surface 22 of a substrate 20 in accordance with the foregoing. Corresponding components between the perforation system 100 of FIG. 2A and the perforation system 200 of FIG. 3A are identified by the same reference numeral and the corresponding discussion above remains applicable to the perforation system 200 unless otherwise noted.

Figure 3B:
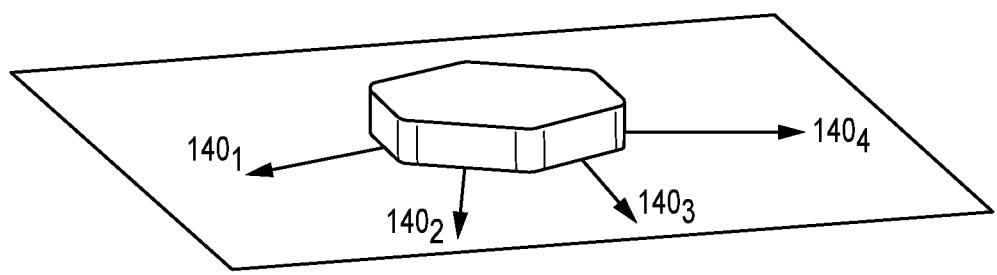
FIG. 3B is a perspective view of the polygon mirror used by the perforation system of FIG. 3A, and illustrating each of the faces of the polygon mirror having normal vectors that are disposed in different orientations when disposed in the same rotational/angular position.

The perforation system 200 may be characterized as including an optical system 210. Components of this optical system 210 include the laser 120, a first polygon mirror 130a, and the mirror 150. The first polygon mirror 130a and mirror 150 may be characterized as a scanner 290. The first polygon mirror 130a is disposed between the laser 120 and the mirror 150 along the optical path of the laser beam 122 proceeding from the laser 120 to the substrate 20, although both the first polygon mirror 130a and the mirror 150 may be disposed at any appropriate position along the noted optical path. Operation of the perforation system 200 may include continuously rotating the first polygon mirror 130a at a constant rotational velocity about its rotational axis 132. A plurality of faces 134a are disposed on a perimeter of the first polygon mirror 130a. Any appropriate number of faces 134a may be disposed on the perimeter of the first polygon mirror 130a (six in the illustrated embodiment). Each of these faces 134a are flat or planar surfaces in one or more embodiments. Unlike the case of the perforation system 100 discussed above, these faces 134a are each disposed in a different orientation relative to the rotational axis 132 of the first polygon mirror 130a and as shown in FIG. 3B.

Figure 3C:
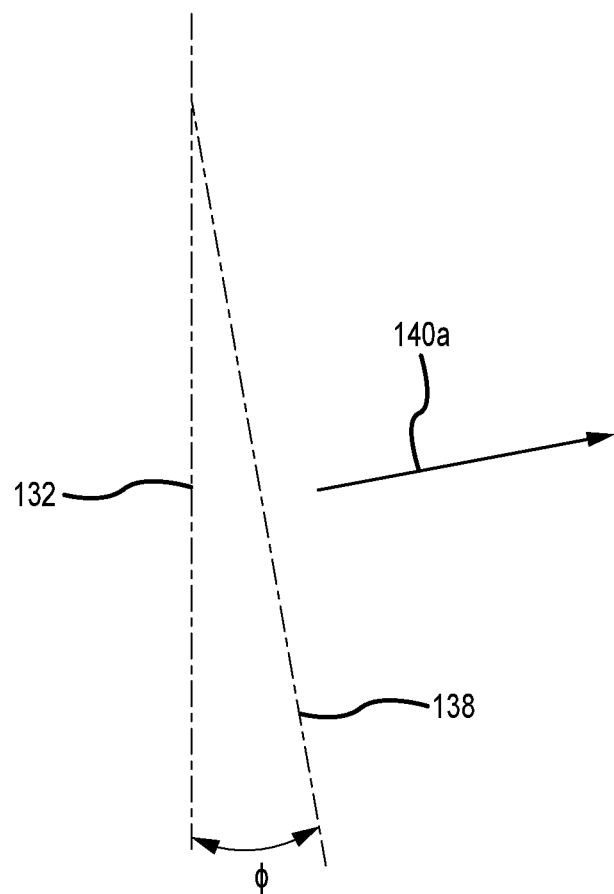
FIG. 3C is a schematic that illustrates an included angle between a rotational axis of the polygon mirror used by the perforation system of FIG. 3A and a vector that is normal to one of its faces.

FIG. 3C shows the orientation of the rotational axis 132 of the first polygon mirror 130a, along with a reference plane 138 that corresponds with one of the faces 134a. As such, a vector 140a that is orthogonal to this face 134a is disposed in an orientation other than perpendicular to the rotational axis 132 of the first polygon mirror 130a. Stated another way, there is an included angle Φ between the rotational axis 132 and the reference plane 138, and this included angle Φ may be any appropriate value that is greater than 0°. Based upon the different orientation of each face 134a of the first polygon mirror 130a, the vector 140a will be in a different orientation for each of the faces 134a of the first polygon mirror 130a when in the same rotational or angular position relative to the rotational axis 132 (see FIG. 3B).

Although adjacent faces 134a of the first polygon mirror 130a may intersect along a line, any appropriate transition may be used between each adjacent pair of faces 134a (e.g., a chamfer; a rounded or convex transition surface). Again, where the laser beam 122 impacts a given face 134a between its corresponding pair of ends 136 (or along the length dimension of such a face 134a) will determine where the laser beam 122 impacts the surface 22 of the substrate 20 in the x dimension noted in FIG. 3A.

The position of the mirror 150 again is controlled by the drive 160. Generally, the position of the mirror 150 at least partially controls where the laser beam 122 impacts the surface 22 of the substrate 20 in the y dimension noted in FIG. 3A. However, the different orientations of the faces 134a of the first polygon mirror 130 also controls where the laser beam 122 impacts the surface 22 of the substrate 20 in the y dimension noted in FIG. 3A. One or more other optical components may be located along the optical path between the mirror 150 and the substrate 20, for instance such that the laser beam 122 impacts the substrate 20 normal to its surface 22.

Operation of the perforation system 200 will be addressed with regard to FIGS. 3A and 3D. FIG. 3A shows a plurality of row sets 30 that extend in the x dimension and that are spaced from one another in the y dimension (e.g., the plurality of row sets 30 may be disposed in parallel relation to one another). Each row set 30 may be characterized as including a plurality of rows 32 that also extend in the x dimension and that are spaced from one another in the y dimension (e.g., the plurality of rows 32 may be disposed in parallel relation to one another). Generally and as shown in FIG. 3D, the laser 120 may be activated such that its laser beam 122 impacts the surface 22 of the substrate 20 at each of the locations shown in FIG. 3D to define a plurality of perforations 12 in each row set 30, where each of these perforations 12 will ultimately have a predetermined perimeter configuration and size, and where the perforations 12 in each row set 30 are spaced from one another in any appropriate fashion (e.g., an equally spaced relation within the given row set 30).

Generally, the mirror 150 may be moved to a fixed position where the laser beam 122 will impact the surface 22 of the substrate 20 within a particular row set 30 at each of a plurality of locations that are spaced in the y dimension (depending upon from which face 134a the laser beam 122 was reflected). That is, each face 134a of the first polygon mirror 130a is associated with a different location in the y dimension shown in FIG. 3D. The laser 120 will be pulsed such that it impacts the surface 22 of the substrate 20 at predetermined locations (either along a given row 32 or between an adjacent pair of rows 32 in the corresponding row set 30 and as shown in FIG. 3D) to define a corresponding portion of each of the perforations 12 in the row set 30, and that is achieved by the laser beam 122 being reflected from a corresponding face 134a of the first polygon mirror 130a as it is being rotated at a constant rotational speed about its rotational axis 132. Again, the location of where the laser beam 122 impacts a face 134a of the first polygon mirror 130a (e.g., where the laser beam 122 impacts a face 134a along its length dimension), determines where the laser beam 122 impacts the surface 22 of the substrate 20 in the x dimension (and in the corresponding row 32 or between the corresponding pair of adjacent rows 32). Unlike the perforation system 100 of FIG. 2A, the mirror 150 of the perforation system 200 of FIG. 3A need not be incremented to different fixed positions in order for the laser beam 122 to scan each of the rows 32 of a particular row set 30 to define each of the desired perforations 12 in this row set 30 (and again where each perforation 12 has a predetermined perimeter configuration and size). Stated another way, the mirror 150 need not be moved to define the entirety of each perforation 12 in the same row set 30 on the substrate 20—the different impact locations of the laser beam 122 in the y dimension are provided by having the first polygon mirror 130a include a plurality of faces 134a that are each disposed in a different orientation relative to the rotational axis 132.

One way in which the perforations 12 shown in FIG. 3D may be produced will be summarized. The mirror 150 may be positioned such that the laser beam 122 will impact the surface 22 of the substrate 20 within the upper row set 30 in the view of FIG. 3D (location 1). With the mirror 150 remaining in this fixed position, the laser 120 may be pulsed and reflected by the various faces 134a of the rotating first polygon mirror 130 to impact the surface 22 of the substrate 20 at the locations shown in FIG. 3D (again, each face 134*a* of the first polygon mirror 130*a* will be associated with a different location within the y dimension of a given row set 30). This may need to be repeated a plurality of times in order for each of the perforations 12 (within a common row set 30) to extend to the desired depth within the substrate 20 (including for a given perforation 12 to extend through the entire thickness of the substrate 20).

After all the perforations 12 in the row set 30 have been defined in accordance with the foregoing, the mirror 150 may be moved to a different fixed position where the laser beam 122 will impact the surface 22 of the substrate 20 within a different row set 30 at each of a plurality of locations that are spaced in the y dimension (depending upon from which face 134*a* the laser beam 122 was reflected), for instance locations 2, 3, 4, and 5 shown in FIG. 3D. This movement of the mirror 150 is shown as Dy in FIG. 3D. Although the perforation system 200 may be operated to sequence in a top-to-down fashion in the view shown in FIG. 3D, and where the entire depth of each perforation 12 in a given row set 30 may be defined prior to proceeding to the next row set 30, other operational configurations may be utilized. For instance, perforations 12 may be partially defined in each of the row sets 30, although this would require more incremental movements of the mirror 150 (e.g., ½ of the desired perforation depth for each perforation 12 in each row set 30 may be defined by a first set of incremental movements of the mirror 150, and this may then be repeated to define the remainder of the desired perforation depth for each perforation 12 in each row set 30 by repeating the noted incremental movements of the mirror 150).

Figure 4:
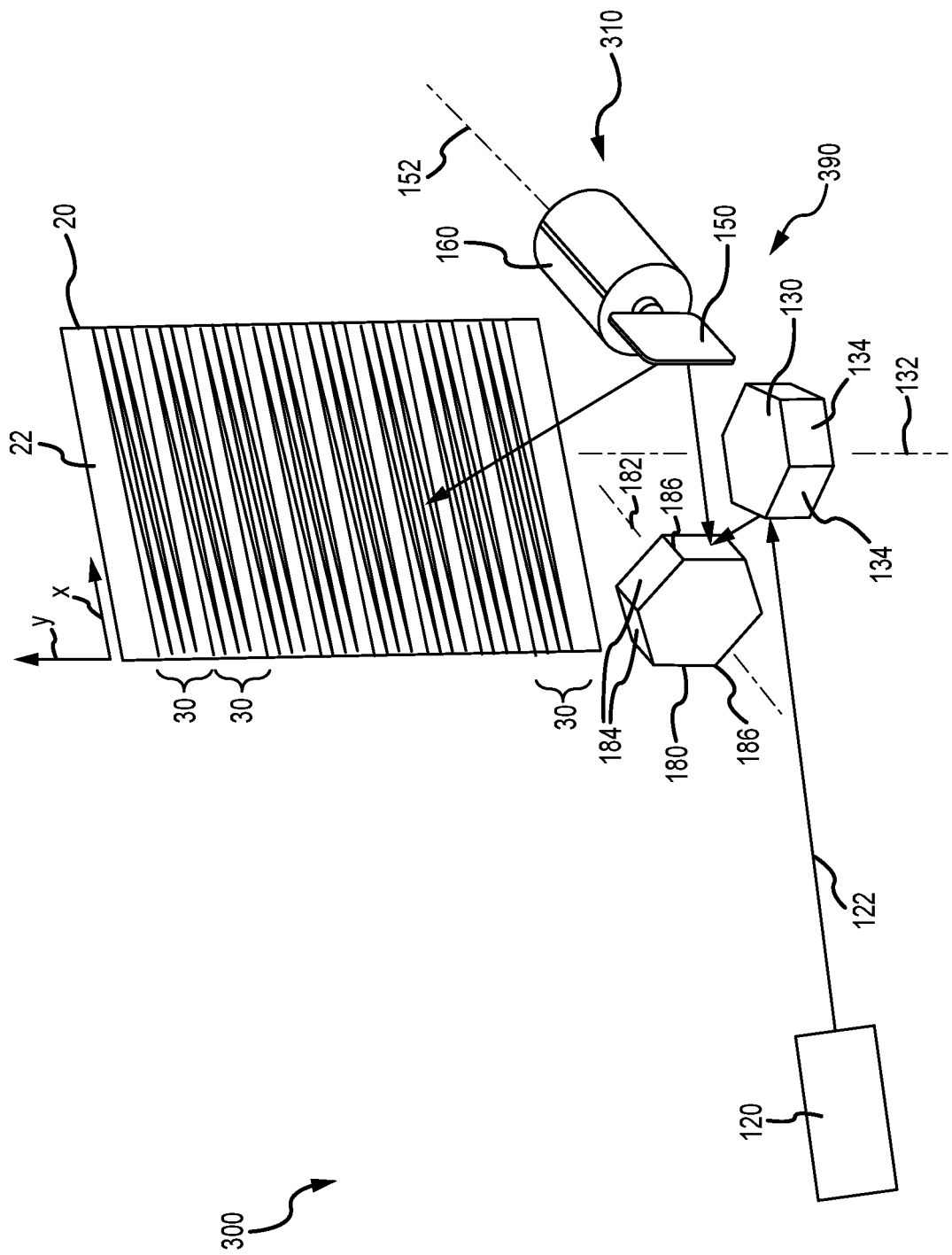
FIG. 4 illustrates a perforation system that utilizes an optical system having rotatable polygon mirrors and a first mirror that operates in a first operational mode to define a plurality of perforations on a substrate.

A perforation system in accordance with various embodiments is illustrated in FIG. 4, is identified by reference numeral 300, and is configured/operated to form a plurality of perforations of a predetermined perimeter configuration and size on a surface 22 of a substrate 20 in accordance with the foregoing. Corresponding components between the perforation system 100 of FIG. 2A and the perforation system 300 of FIG. 4 are identified by the same reference numerals and the corresponding discussion above remains applicable to the perforation system 300 unless otherwise noted.

The perforation system 300 may be characterized as including an optical system 310. Components of this optical system 310 include the laser 120, the first polygon mirror 130, a second polygon mirror 180, and the mirror 150, and each of which may be disposed at any appropriate position along the optical path proceeding from the laser 120 to the substrate 20. The first polygon mirror 130, the second polygon mirror 180, and the mirror 150 may be characterized as a scanner 390. The first polygon mirror 130 may be disposed between the laser 120 and the second polygon mirror 180 along the optical path of the laser beam 122 proceeding from the laser 120 to the substrate 20, and is rotated at a constant rotational velocity about its rotational axis 132. As in the case of the perforation system 100 of FIG. 2A, the first polygon mirror 130 of the perforation system 300 of FIG. 4 controls where the laser beam 122 impacts the surface 22 of the substrate 20 in the x dimension. More specifically, where the laser beam 122 impacts a given face 134 along its length dimension will determine where the laser beam 122 impacts the surface 22 of the substrate 20 in the x dimension noted in FIG. 4.

The second polygon mirror 180 may be disposed between the first polygon mirror 130 and the mirror 150 along the optical path of the laser beam 122 proceeding from the laser beam 122 to the substrate 20. Operation of the perforation system 300 may include continuously rotating the second polygon mirror 180 at a constant rotational velocity about its rotational axis 182 (e.g., an appropriate rotational drive may be interconnected with the second polygon mirror 180). A plurality of faces 184 are disposed on a perimeter of the second polygon mirror 180. Any appropriate number of faces 184 may be disposed on the perimeter of the second polygon mirror 180 (six in the illustrated embodiment). Each of these faces 184 are flat or planar surfaces in one or more embodiments. Moreover, these faces 184 are disposed parallel to the rotational axis 182 of the second polygon mirror 180 for the case of the perforation system 300 (e.g., in accord with the first polygon mirror 130 and as described above). As such, a vector that is normal to its corresponding face 184 is parallel to or colinear with the same vector of each other face 184 of the second polygon mirror 180 when disposed in the same rotational or angular position relative to the rotational axis 182.

A common included angle exists between each adjacent pair of faces 184 of the second polygon mirror 180, similar to the first polygon mirror 130 discussed above. Although adjacent faces 184 may intersect along a line, any appropriate transition may be used between each adjacent pair of faces 184 (e.g., a chamfer; a rounded or convex transition surface). Where the laser beam 122 impacts a given face 184 between its corresponding pair of ends 186 (and that may be referred to as defining a length dimension of such a face 184) will at least in part determine where the laser beam 122 impacts the surface 22 of the substrate 20 in the y dimension noted in FIG. 4.

The orientation of the rotational axis 132 for the first polygon mirror 130 is different than the orientation of the rotational axis 182 for the second polygon mirror 180. The rotational axis 132 of the first polygon mirror 130 is orientated to control where the laser beam 122 impacts the surface 22 of the substrate 20 in the x dimension noted in FIG. 4. In contrast, the rotational axis 182 of the second polygon mirror 180 is orientated to control where the laser beam 122 impacts the surface 22 of the substrate 20 in the y dimension noted in FIG. 4. For the case where the number of faces 134 used by first polygon mirror 130 is the same as the number of faces 184 used by the second polygon mirror 180, the first polygon mirror 130 may be rotated at a different rate than the second polygon mirror 180, including where the first polygon mirror 130 is rotated at a higher rotational speed than the second polygon mirror 180 (although both polygon mirrors 130, 180 will typically each be rotated at a constant rotational speed). The first polygon mirror 130 and the second polygon mirror 180 could be rotated at a common rotational speed if the number of faces 134 for the first polygon mirror 130 differed from the number of faces 184 for the second polygon mirror 180.

The mirror 150 may be disposed between the second polygon mirror 180 and the substrate 20 along the optical path of the laser beam 122 proceeding from the laser 120 to the substrate 20. The position of the mirror 150 is again controlled by the drive 160 that rotates the mirror 150 about its rotational axis 152. Generally, the position of the mirror 150 controls in part where the laser beam 122 impacts the surface 22 of the substrate 20 in the y dimension noted on FIG. 4 (again, the rotating second polygon mirror 180 also controls in part where the laser beam 122 impacts the surface 22 of the substrate 20 in the y dimension noted on FIG. 4). One or more other optical components may be located along the optical path between the mirror 150 and the substrate 20, for instance such that the laser beam 122 impacts the substrate 20 normal to its surface 22.

Operation of the perforation system 300 of FIG. 4 is at least somewhat functionally similar to what is shown and described above in relation to FIG. 3D and the perforation system 200. FIG. 4 shows a plurality of row sets 30 that each extend in the x dimension and that are spaced from one another in the y dimension (e.g., the plurality of row sets 30 may be disposed in parallel relation to one another). Each row set 30 includes a plurality of rows 32 (see FIG. 3D) that also extend in the x dimension and that are spaced from one another in the y dimension (e.g., the plurality of rows in a given row set 30 may be disposed in parallel relation to one another). Generally and as shown in FIG. 4, the laser 120 may be activated such that its laser beam 122 impacts the surface 22 of the substrate 20 at each of the locations shown in FIG. 3D to define a plurality of perforations 12 in a given row set 30, where each of these perforations 12 will ultimately have a predetermined perimeter configuration and size, and where the perforations 12 in a given row set 30 are spaced from one another in any appropriate fashion (e.g., an equally spaced relation within the given row set 30). Each of the row sets 30 are separately scanned by the laser 120 in the case of the perforation system 300 of FIG. 4.

Generally, the mirror 150 in the case of the perforation system 300 of FIG. 4 may be moved to a fixed position where the laser beam 122 will impact the surface 22 of the substrate 20 within a particular row set 30 at each of a plurality of locations that are spaced in the y dimension (via the rotating second polygon mirror 180). Within this row set 30, where the laser beam 122 will impact the surface 22 of the substrate 20 in the y dimension will depend upon where the laser beam 122 impacts a face 184 of the second polygon mirror 180 along its length dimension. The laser 120 will further be pulsed such that it impacts the surface 22 of the substrate 20 at predetermined locations in the x dimension (either along a given row or between an adjacent pair of rows of a corresponding row set 30) to define a corresponding portion of each of the perforations 12 in the row set 30, and that is achieved by the laser beam 122 being reflected from a corresponding face 134 of the first polygon mirror 130 as it is being rotated at a constant rotational speed about its rotational axis 132. Again, the location of where the laser beam 122 impacts a face 134 of the first polygon mirror 130 (e.g., where the laser beam 122 impacts a face 134 along its length dimension), determines where the laser beam 122 impacts the surface 22 of the substrate 20 in the x dimension (and in the corresponding row or between the corresponding pair of adjacent rows of the current row set 30). Unlike the perforation system 100 of FIG. 2A, the mirror 150 of the perforation system 300 of FIG. 4 need not be incremented to different fixed positions in order for the laser beam 122 to scan each of the rows of a particular row set 30 to define each of the desired perforations 12 in this row set 30 (and again where each perforation 12 will ultimately have a predetermined perimeter configuration and size). This capacity for different locations in the y dimension within a particular row set 30 is provided by the rotating second polygon mirror 180.

One way in which the perforations 12 shown in FIG. 3D may be produced by the perforation system 300 of FIG. 4 will be summarized. The mirror 150 may be positioned such that the laser beam 122 will impact the surface 22 of the substrate 20 within the upper row set 30 in the view of FIG. 3D (i.e., location 1). With the mirror 150 remaining in this fixed position, the laser 120 may be pulsed and its laser beam 122 reflected by one or more faces 134 of the rotating first polygon mirror 130 (to have the laser beam 122 impact the surface 22 of the substrate 20 at a particular location in the x dimension in the row set 30) and the laser beam 122 will also be reflected by one or more faces 184 of the rotating second polygon mirror 180 (to have the laser beam 122 impact the surface 22 of the substrate 20 at a particular location in the y dimension in the row set 30). This may need to be repeated a plurality of times in order for each of the perforations 12 (within a common row set 30—FIG. 3D) to extend to the desired depth within the substrate 20 (including for a given perforation 12 to extend through the entire thickness of the substrate 20).

After all the perforations 12 in the noted row set 30 have been defined in accordance with the foregoing via operation of the perforation system 300 of FIG. 4, the mirror 150 may be moved to a different fixed position (one of locations 2, 3, 4, and 5 shown in FIG. 3D) for repetition in accordance with the foregoing. This movement of the mirror 150 is shown as Dy in FIG. 3D. Although the perforation system 300 of FIG. 4 may be operated to scan or sequence in a top-to-down fashion in the view shown in FIG. 3D, and where the entire depth of each perforation 12 in a given row set 30 is defined prior to proceeding to the next row set 30, other operational configurations may be utilized. For instance, perforations 12 may be partially defined in each of the row sets 30, although this would require more incremental movements of the mirror 150 (e.g., ½ of the desired perforation depth for each perforation 12 in each row set 30 may be defined by a first set of incremental movements of the mirror 150, and this may then be repeated to define the remainder of the desired perforation depth for each perforation in each row set 30 by repeating the noted incremental movements of the mirror 150). It should also be appreciated that the laser 120 may separately scan the various row sets 30 in any order (i.e., it is not required to sequence through the row sets 30 in order).

Figure 5:
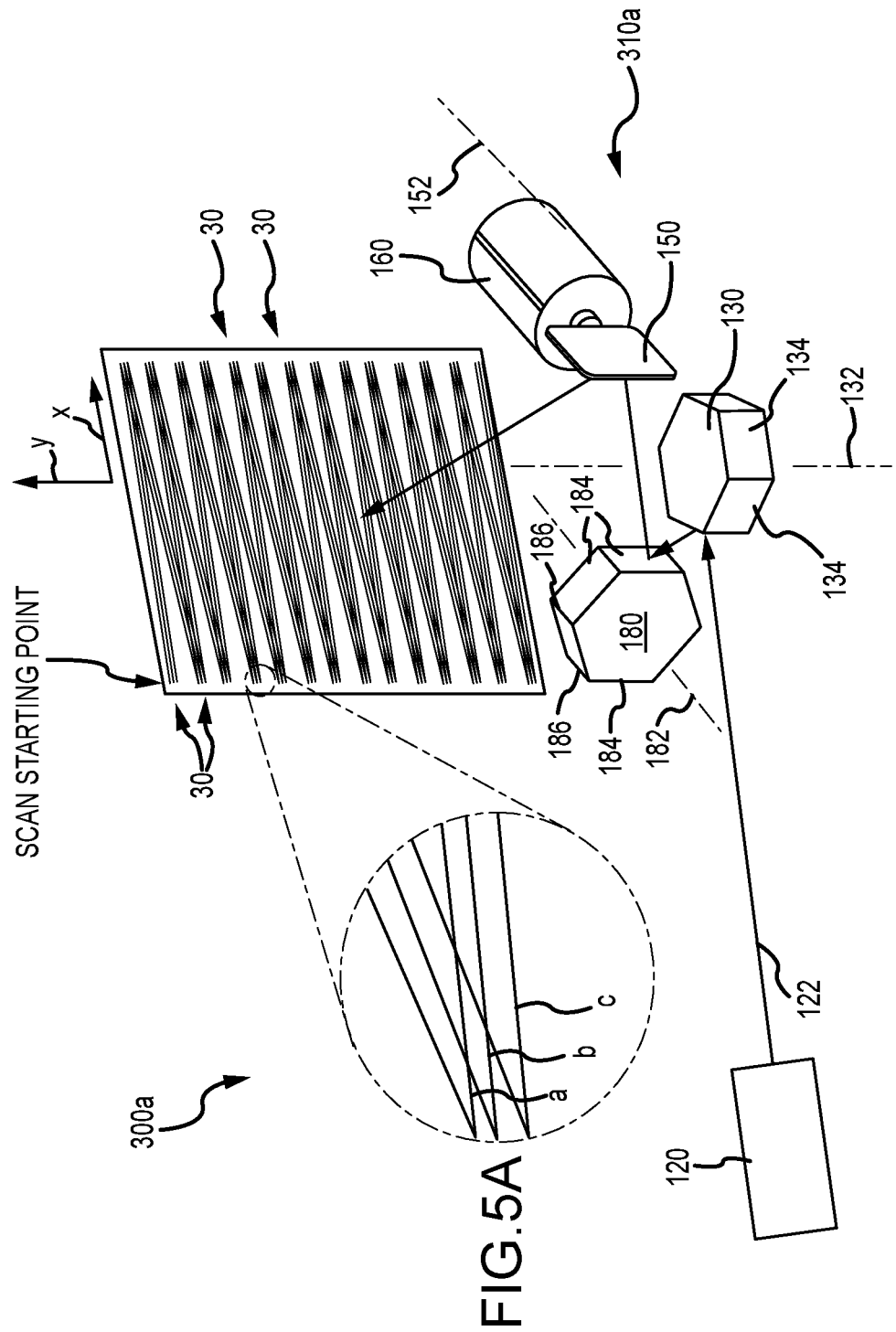
FIG. 5 illustrates a perforation system that utilizes an optical system having rotatable polygon mirrors and a first mirror that operates in a second operational mode to define a plurality of perforations on a substrate (FIG. 5A being an enlargement of the noted portion of FIG. 5)

A perforation system in accordance with various embodiments is illustrated in FIG. 5, is identified by reference numeral 300a, and is configured/operated to form a plurality of perforations of a predetermined perimeter configuration and size on a surface 22 of a substrate 20 in accordance with the foregoing. The perforation system 300a uses the same components as the perforation system 300 of FIG. 4 (the first polygon mirror 130, the second polygon mirror 180, and the mirror 150 may be characterized as a scanner 390). However, the perforation system 300a of FIG. 5 is operated differently than the perforation system 300 of FIG. 4 to form a plurality of perforations of a predetermined perimeter configuration and size on a surface 22 of a substrate 20 in accordance with the foregoing. In the case of the perforation system 300a, the second polygon mirror 180 may be rotating at a higher rotational speed than in the case of the perforation system 300 of FIG. 4. One or more other optical components may be located along the optical path between the mirror 150 and the substrate 20, for instance such that the laser beam 122 impacts the substrate 20 normal to its surface 22.

Operation of the perforation system 300a of FIG. 5 again will be described in relation to FIG. 3D. Generally and for a single fixed position of the mirror 150, the laser beam 122 from the laser 120 will be scanned to impact various locations in multiple row sets 30 (e.g., FIG. 3D). For instance and again for a single fixed position of the mirror 150, the laser beam 122 from the laser 120 may be scanned to impact various locations in each of the row sets 30 shown in FIG. 3D (e.g., scanning from top to bottom in the view shown in FIG. 3D for a single, fixed position of the mirror 150). This scan may need to be repeated a plurality of times in order for the corresponding portions of the perforations 12 (again, within each of multiple row sets 30) to extend to the desired depth within the substrate 20 (including for a given corresponding portion of each perforation 12 to extend through the entire thickness of the substrate 20). The location from which the laser beam 122 is reflected by a face 134 of the first polygon mirror 130 will determine the location in the x dimension where the laser beam 122 will impact the surface 22 of the substrate 20, whereas the location from which the laser beam 122 is reflected by a face 184 of the second polygon mirror 130 will determine the location in the y dimension where the laser beam 122 will impact the surface 22 of the substrate 20, all for a given fixed position of the mirror 150.

The foregoing is repeated for each of a plurality of different positions of the mirror 150, where each different position of the mirror will change the y dimension of the area of the substrate 20 that is scanned in accordance with the foregoing (see representative different positions a, b, and c in FIG. 5A). After the above-noted scanning has been repeated for each of certain number of different positions of the mirror 150, this will ultimately define a plurality of perforations 12 in the substrate 20, and where each such perforation 12 has a predetermined perimeter configuration and size.

Figure 7A:
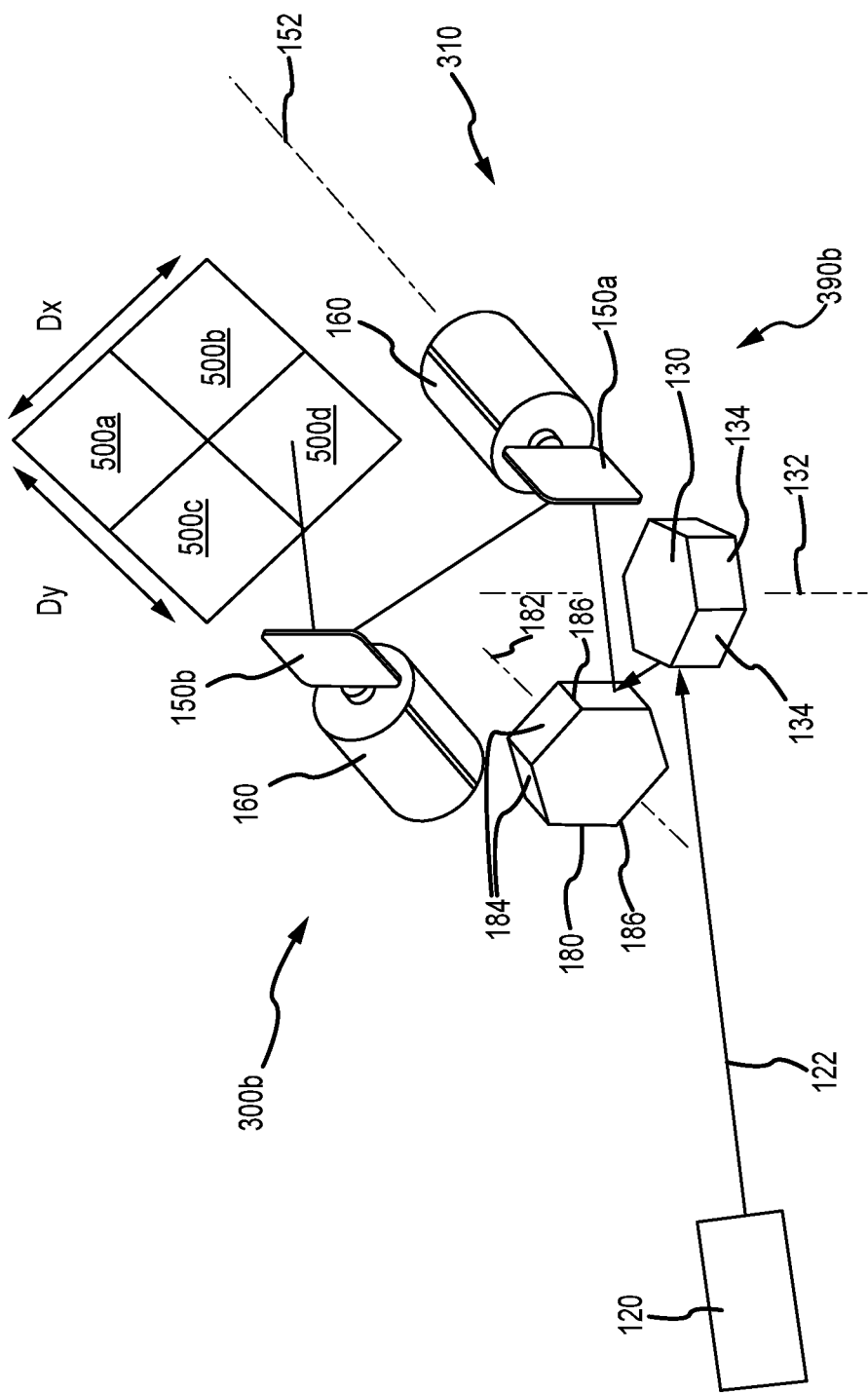
FIG. 7A illustrates a perforation system that utilizes a first polygon mirror, a second polygon mirror, a first positioning mirror, and a second positioning mirror that accommodates formation of perforations in each of a number of different quadrants.

A perforation system accordance with various embodiments is illustrated in FIG. 7A, is identified by reference numeral 300b, and is configured/operated to form a plurality of perforations (e.g., perforations 12—FIG. 7B) of a predetermined perimeter configuration and size on a surface of a substrate (e.g., substrate 20—FIG. 7B) in accordance with the foregoing. The perforation system 300b includes the first polygon mirror 130 and the second polygon mirror 180 in accordance with the perforation systems 300, 300a. The perforation system 300b further includes a first positioning mirror 150a (e.g., in accordance with the mirror 150 discussed above in relation to the perforation systems 300, 300a), and a second positioning mirror 150b. The position of the second positioning mirror 150b is controlled by a drive 160 that rotates the second positioning mirror 150b about rotational axis 152b. The rotational axis 152a of the first positioning mirror 150a, and the rotational axis 152b of the second positioning mirror 150b are disposed in different orientations. The first polygon mirror 130, the second polygon mirror 180, the first positioning mirror 150a, and the second positioning mirror 150b each may be disposed at any appropriate position along the optical path proceeding from the laser 120 to the substrate 20. The first polygon mirror 130, the second polygon mirror 180, the first positioning mirror 150a, and the second positioning mirror 150b may be characterized as a scanner 390b.

Figure 7B:
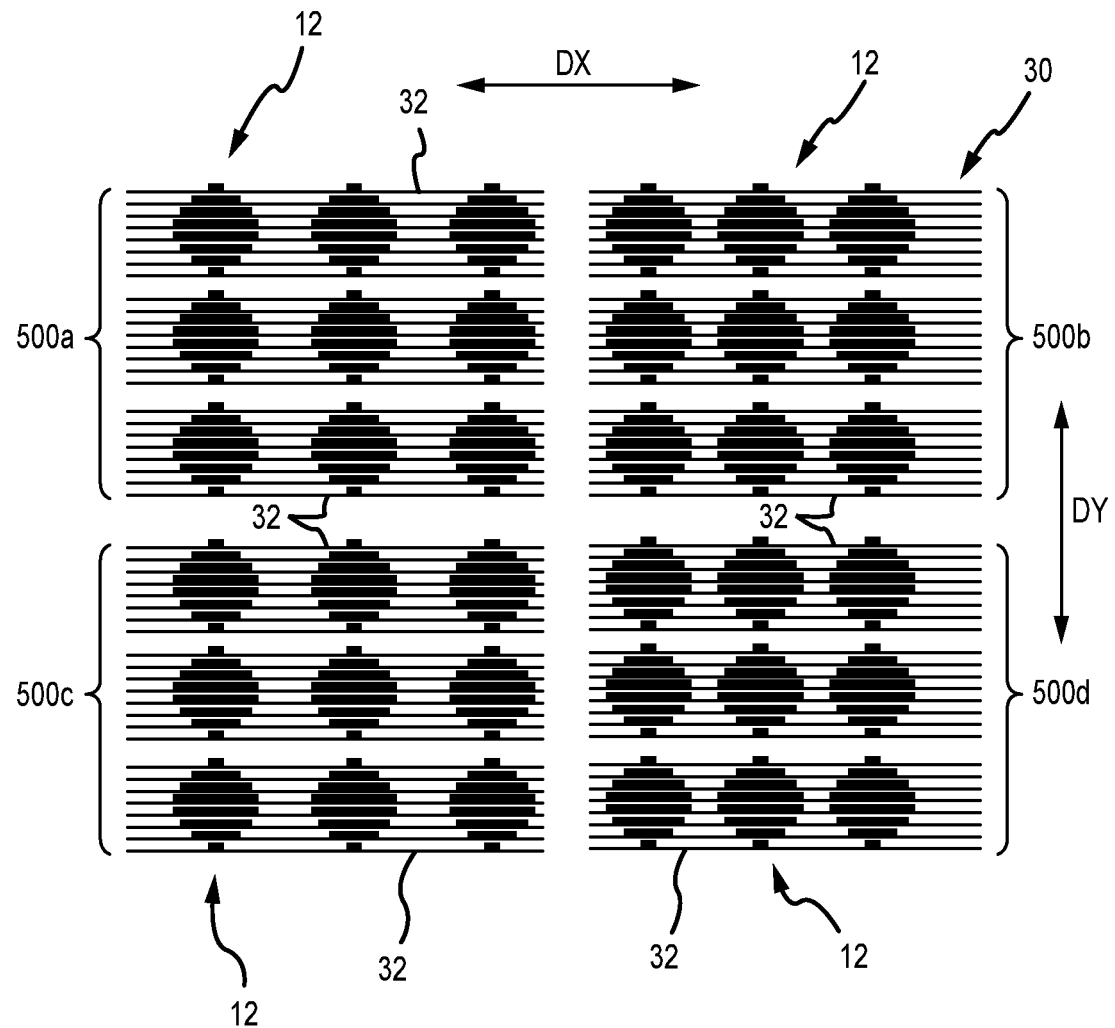
FIG. 7B is a schematic of perforations formed in different quadrants using the perforation system of FIG. 7A.

Generally, the second positioning mirror 150b may be moved/adjusted to accommodate formation of one or more perforations in different quadrants that occupy different positions in a first dimension (e.g., an x dimension). The first positioning mirror 150a may be moved/adjusted to accommodate formation of one or more perforations in different quadrants that occupy different positions in a second dimension (e.g., a y dimension) that is orthogonal to the first dimension. FIG. 7B illustrates four different quadrants 500a, 500b, 500c, and 500d. The second positioning mirror 150b provides for an adjustment in the x dimension (DX in FIG. 7B), for instance to move from quadrant 500a to quadrant 500b, or to move from quadrant 500c to quadrant 500d. The first positioning mirror 150a provides for an adjustment in the y dimension (DY in FIG. 7B), for instance to move from quadrant 500a to quadrant 500c, or to move from quadrant 500b to quadrant 500d.

The first polygon mirror 130, the second polygon mirror 180, and the first positioning mirror 150a furthermore may be operated to form one or more perforations 12 in each of these quadrants 500a, 500b, 500c, and 500d in accordance with the perforation system 300 or the perforation system 300b. The quadrant 500a and quadrant 500b occupy different positions in the noted first dimension, while the quadrant 500c and quadrant 500d occupy different positions in the noted first dimension. The quadrant 500a and the quadrant 500c occupy different positions in the noted second dimension, while the quadrant 500b and quadrant 500d occupy different positions in the noted second dimension.

Figure 6:
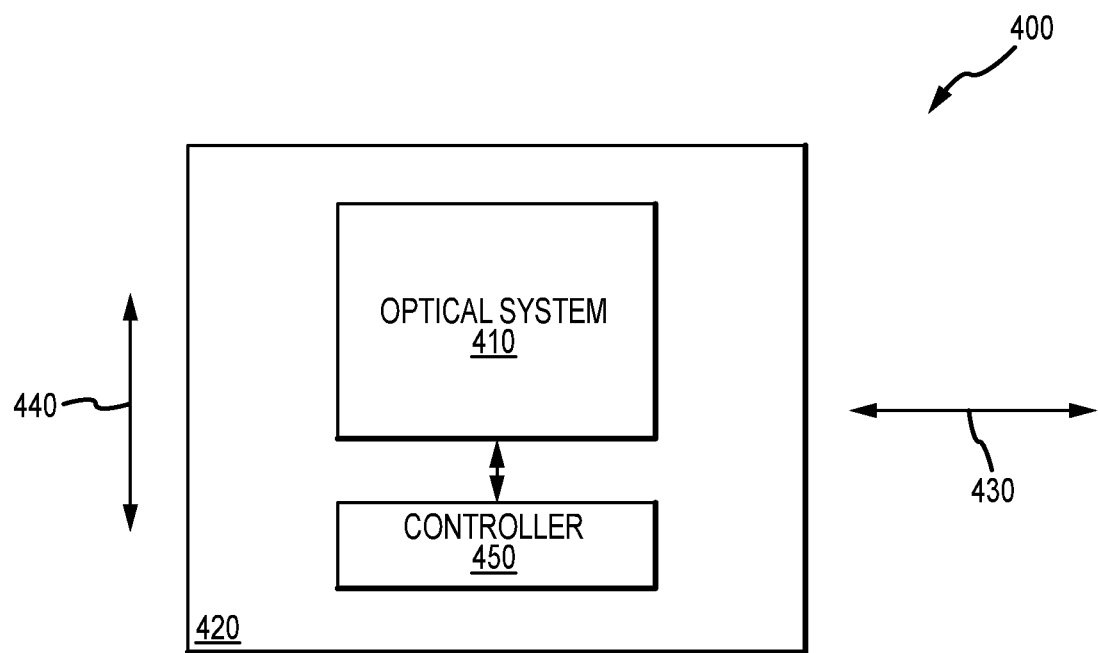
FIG. 6 is a schematic of a perforation system that may utilize an optical system, such as the optical systems shown in FIGS. 2A, 3A, 4, and 5.

The perforation systems 100, 200, 300, 300a discussed above may be used to define a plurality of perforations over an area of a substrate of any appropriate size. One way in which this may be done is in accordance with the perforation system 400 that is schematically presented in FIG. 6. The perforation system 400 includes an optical system 410, a base 420, and a controller 450. The optical system 410 may, for instance, be in accordance with any of the perforation systems 100, 200, 300, 300a discussed above. The controller 450 may be operatively interconnected with both the base 420 and the optical system 410, and may be of any appropriate configuration/architecture. For instance, the controller 450 may be operatively interconnected with the laser 120, the rotational drive source for the polygon mirrors 130/130a, 180, and the drive 160 for the mirror 150. The base 420 may be moved in each of an x dimension 430 and a y dimension 440 such that after the optical system 410 has formed perforations on one section of a substrate, the base 420 may be moved such that the optical system 410 may thereafter form perforations on a completely different section of the same substrate. This may be done any appropriate number of times.

The above-discussed perforation system 100, 200, 300, and 300a are believed to significantly reduce the amount of time to form a plurality of perforations compared to a standard two galvanometer mirror system. The advantage becomes more and more relevant as the size of the surface on which perforations are formed increases and when forming at least a certain number of perforations.

Figure 8:
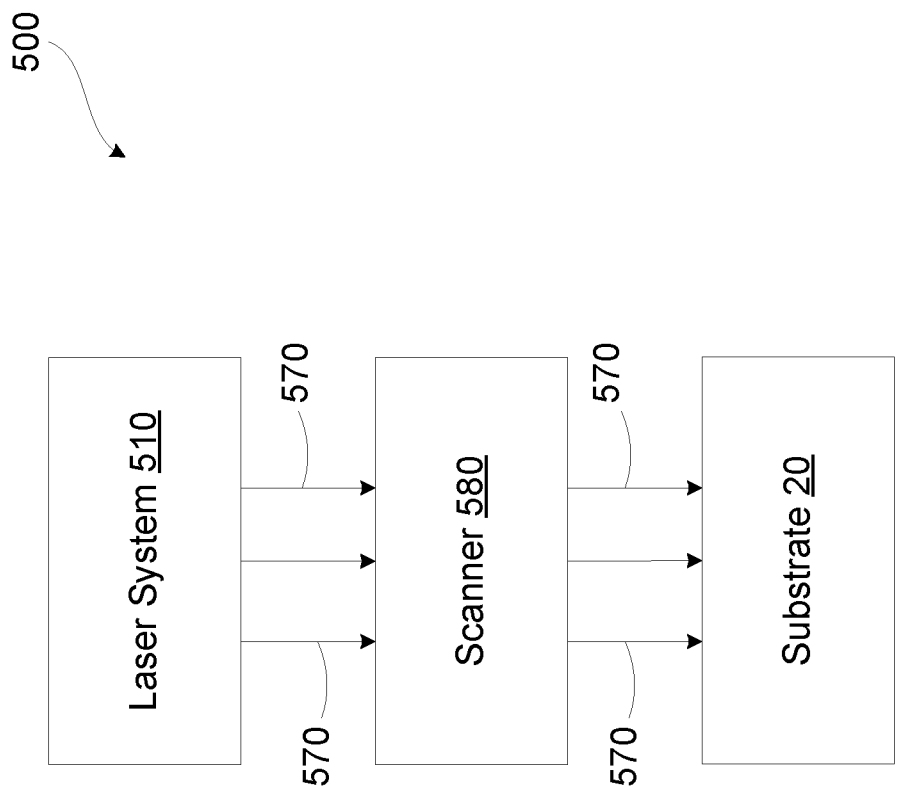
FIG. 8 illustrates a perforation system that utilizes beamlets.

A perforation system is illustrated in FIG. 8 and is identified by reference numeral 500. Components of the perforation system 500 include a laser system 510 and a scanner 580. Generally, the laser system 510 creates and outputs a plurality of beamlets 570 (addressed below). The scanner 580 moves each of these beamlets 570 in at least two different dimensions on the substrate 20 to define multiple perforations. Each beamlet 570 may be moved by the scanner 580 to define a corresponding perforation on the substrate 20. The scanner 580 may be of any appropriate configuration, for instance in accordance with the above-described scanners 190, 290, 390, 390a, and 390b.

Figure 8A:
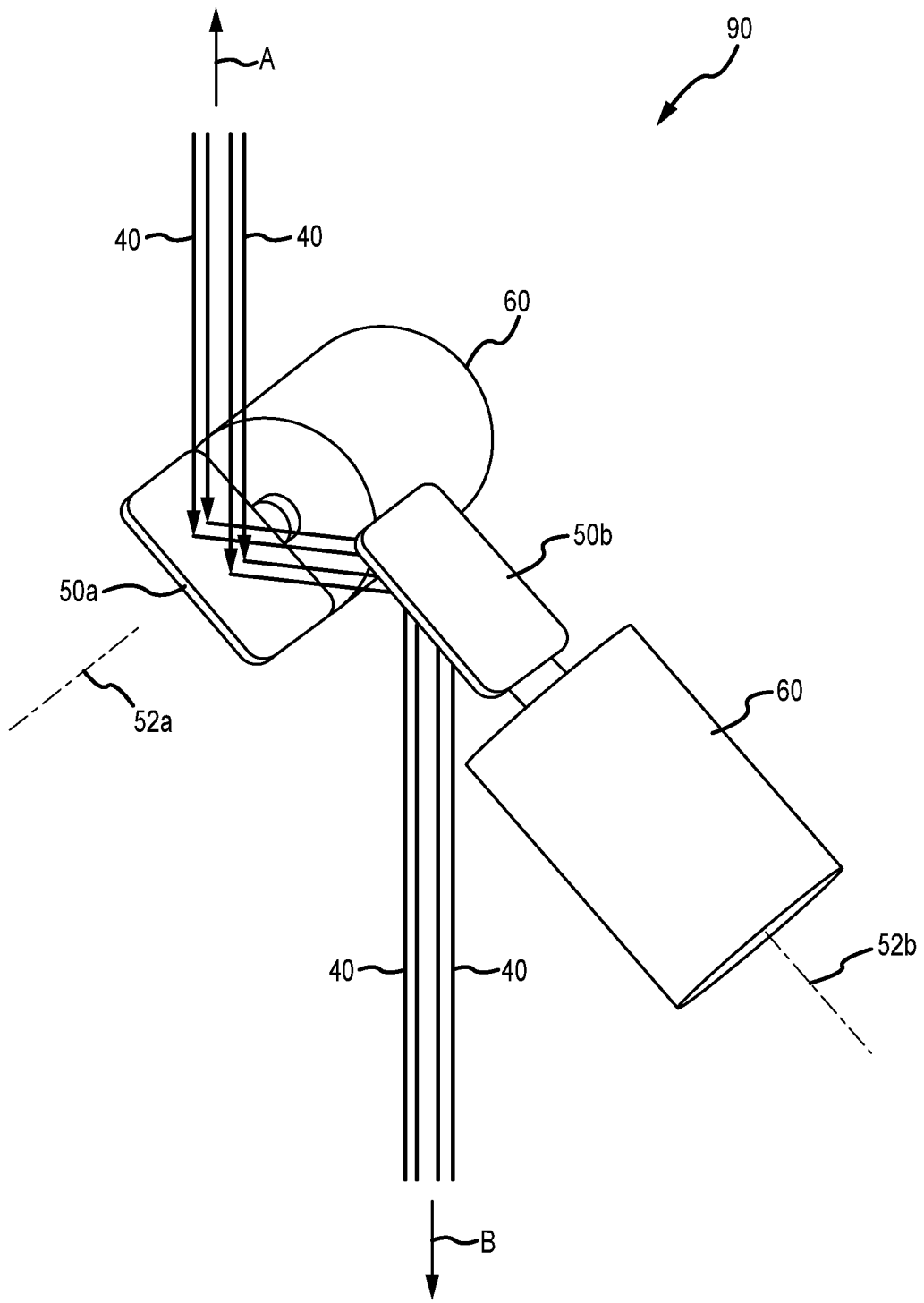
FIG. 8A illustrates a scanner that may be used by the perforation system of FIG. 8.

Another scanner that could be used by the perforation system 500 to form perforations on the substrate 20 is illustrated in FIG. 8A and is identified by reference numeral 90. The scanner 90 includes a movable first positioning mirror 50a and a movable second positioning mirror 50b. Arrow A identifies the direction of a laser system used with the scanner 90, while arrow B identifies the direction of the substrate on which the perforations are formed. The output from the laser system includes a plurality of beamlets 40, that are reflected by the first positioning mirror 50a, and then by the second positioning mirror 50b. The scanner 90 moves each of these beamlets 40 in at least two different dimensions on the substrate 20 to define multiple perforations in accordance with the foregoing.

The position of the mirrors 50a, 50b is controlled by a drive 60 (e.g., a servomotor or a galvanometer that rotates the corresponding mirror 50a, 50b about its corresponding rotational axis 52a, 52b). The position of the first mirror 50a controls where the beamlets 40 impact the substrate 20 in a first dimension (e.g., an x dimension), while the position of the second mirror 50b controls where the beamlets impact the substrate 20 in a second dimension (e.g., a y dimension) that is orthogonal to the first dimension. The rotational axes 52a, 52b are disposed in different orientations.

A representative laser system that may be used by the perforation system 500 of FIG. 8 is illustrated in FIG. 9A and is identified by reference numeral 510a. The laser system 510a includes a laser 520, a beam expander 540, a beam homogenizer 550, and a lenslet array 560 (e.g., an optical beamlet generator). The laser 520 outputs a collimated laser beam 530 that is directed to the beam expander 540. The beam expander 540 is an optical device that takes the collimated laser beam 530 and expands its size to an expanded laser beam 530a. The expanded laser beam 530a is output from the beam expander 540 and is directed to the beam homogenizer 550. The beam homogenizer 550 is an optical device that smooths out irregularities in the expanded laser beam 530a output from the beam expander 540, and enhances the uniformity of the expanded laser beam 530a to define an expanded, homogenized laser beam 530b. The expanded, homogenized laser beam 530b is output from the beam homogenizer 550 and is directed to the lenslet array 560.

The lenslet array 560 includes a plurality of lenslets (small lenses) to produce a plurality of beamlets 570 that are directed to the scanner 580 (FIG. 8). Each lenslet of the lenslet array 560 produces a corresponding beamlet 570. The lenslet array 560 may be configured to generate any appropriate number of beamlets 570, to dispose a plurality of beamlets 570 in any appropriate arrangement/pattern, or both. In various embodiments the beamlets 570 are output from the lenslet array 560 in at least substantially parallel relation to one another. The lenslet array 560 may generate the plurality of beamlets 570 from a single laser beam (e.g., collimated).

"Beamlets" as used herein means a number of discrete laser beams that are generated from a single collimated laser beam (e.g., beamlets may be characterized as a subset of a single collimated laser beam). The collective power of the beamlets 570 emitted from the lenslet array 560 at least generally corresponds with the power of the collimated laser beam 530 emitted from the laser 520. Various embodiments have the collective power of the beamlets 570 emitted from the lenslet array 560 being at least 90 percent of the power of the collimated laser beam 530.

Figure 9B:
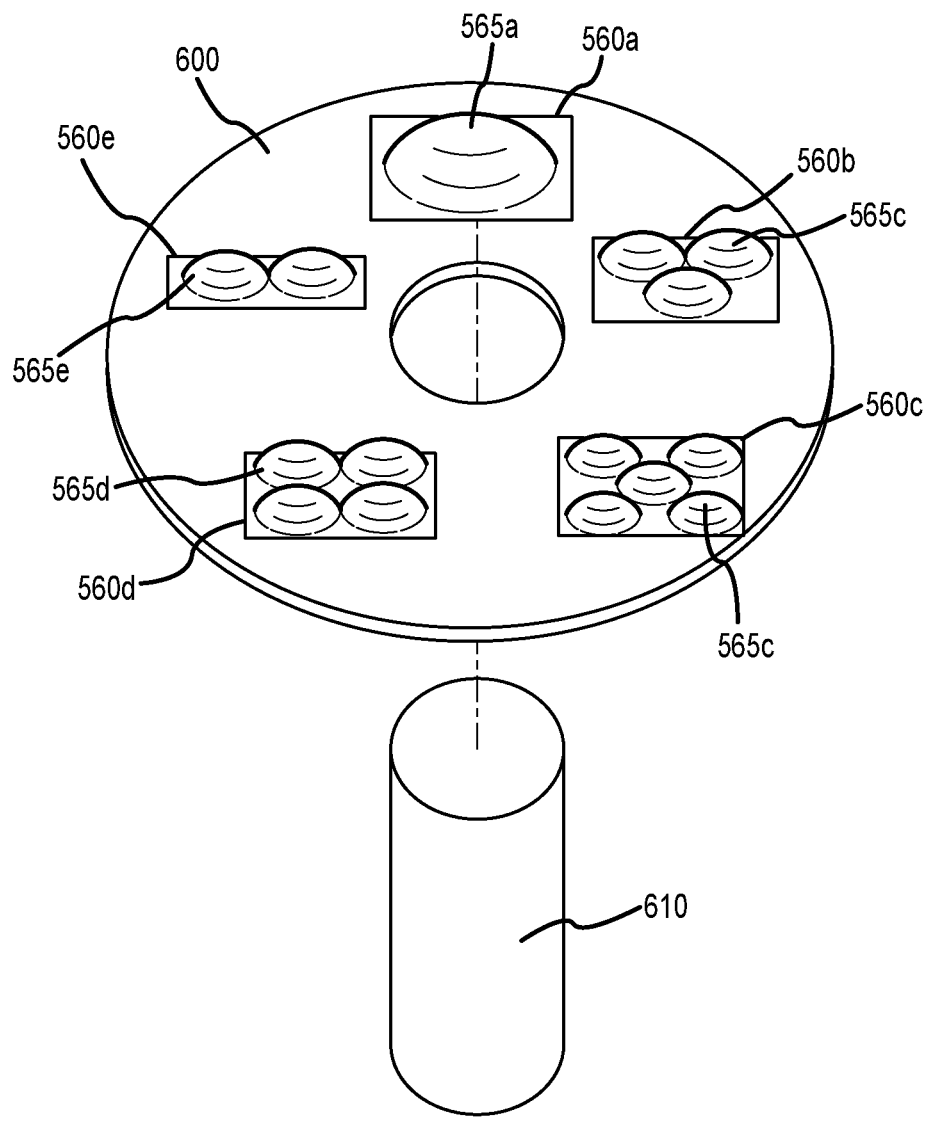
FIG. 9B is a perspective view of a movable base that incorporates a plurality of lenslet arrays.

A lenslet base or carousel is illustrated in FIG. 9B, is identified by reference numeral 600, and may be used in place of the lenslet array 560 for the laser system 510a illustrated in FIG. 9A. The lenslet carousel 600 includes a plurality of lenslet arrays 560 (e.g., lenslet arrays 560a, 560b, 560c, 560d, and 560e). Any appropriate number of lenslet arrays 560 may be utilized by the lenslet carousel 600. Each lenslet array 560 incorporated by carousel 600 includes at least one lenslet. For instance, lenslet array 560a includes a single lenslet 565a; lenslet array 560b includes three lenslets 565b; lenslet array 560c includes five lenslets 565c; lenslet array 560d includes four lenslets 565d; and lenslet array 560e includes two lenslets 565e. Each lenslet array 560 for the carousel 600 may include any appropriate number of lenslets and multiple lenslets may be disposed in any appropriate arrangement/pattern (to output a corresponding arrangement/pattern of beamlets 570 on the substrate 20). Generally, the lenslet carousel 600 may be moved (e.g., rotated, for instance by a drive 610) to dispose one of its lenslet arrays 560 in the optical path of the laser system 510a of FIG. 9A. In various embodiments, one or more lenslet arrays 560 (including each of the lenslet arrays 560) may be detachably connected to the carousel 600 (e.g., to accommodate changing one lenslet array 560 out for another lenslet array 560). At least some of the lenslet arrays 560 may differ in at least one respect from the other lenslet arrays 560, including where each lenslet array 560 differs from every other lenslet array 560 (e.g., in relation to the number and/or arrangement of the lenslets 565).

Any appropriate number of the lenslet arrays 560 of the carousel 600 could be used to define perforations on the substrate 20 (FIG. 8). For instance, one lenslet array 560 of the carousel 600 could be used to define perforations throughout one region of the substrate 20, while a different lenslet array 560 of the carousel 600 could be used to define perforations throughout a different region of the same substrate 20. Two or more lenslet arrays 560 of the carousel 600 could be used to define perforations throughout a common region of the substrate 20.

Another representative laser system that may be used by the perforation system 500 of FIG. 8 is illustrated in FIG. 10A and is identified by reference numeral 510b. Corresponding components between FIGS. 9A and 10A are identified by the same reference numerals, and the discussion presented above remains equally applicable unless otherwise noted. The laser system 510b includes the laser 520, the beam expander 540, the beam homogenizer 550, and a diffractive optical element 590 (DOE) (e.g., an optical beamlet generator). The diffractive optical element 590 produces beamlets 570. The diffractive optical element 590 may be configured to generate any appropriate number of beamlets 570, to output a plurality of beamlets 570 in any appropriate arrangement/pattern, or both. In various embodiments the beamlets 570 are output from the diffractive optical element 590 in at least substantially parallel relation to one another. The diffractive optical element 590 may generate the plurality of beamlets 570 from a single laser beam (e.g., collimated).

Figure 10B:
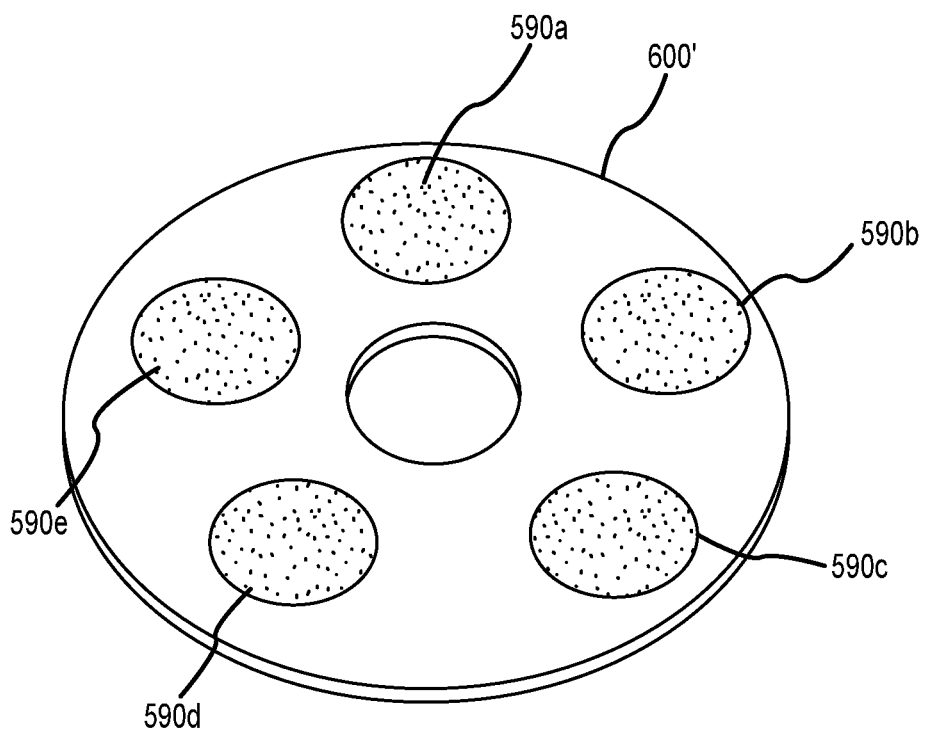
FIG. 10B is a perspective view of a movable base that incorporates a plurality of diffractive optical elements.

A DOE base or carousel is illustrated in FIG. 10B, is identified by reference numeral 600', and may be used in place of the diffractive optical element 590 for the laser system 510b illustrated in FIG. 10A. The DOE carousel 600' includes a plurality of diffractive optical elements 590 (e.g., DOE 590a, DOE 590b, DOE 590c, DOE 590d, and DOE 590e). One or more of the DOEs 590 of the carousel 600' may be of a different configuration, including where each DOE 590 is of a different configuration (e.g., in relation to the number and/or arrangement of the beamlets 570 output from a given DOE 590). Any appropriate number of diffractive optical elements 590 may be utilized by the DOE carousel 600'. Each DOE 590 may be configured to output any appropriate number of beamlets 570 and multiple beamlets 570 may be output from a given DOE 590 in any appropriate arrangement/pattern. Generally, the DOE carousel 600' may be moved (e.g., rotated, for instance by the drive 610 shown in FIG. 9B) to dispose one of its DOEs 590 in the optical path of the laser system 510b of FIG. 10A. In various embodiments, one or more DOEs 590 (including each of the DOEs 590) may be detachably connected to the carousel 600' (e.g., to accommodate changing one DOE 590 out for another DOE 590).

Any appropriate number of diffractive optical elements 590 of the carousel 600' could be used to define perforations on the substrate 20 (FIG. 8). For instance, one diffractive optical element 590 of the carousel 600' could be used to define perforations throughout one region of the substrate 20, while a different diffractive optical element 590 of the carousel 600' could be used to define perforations throughout a different region of the same substrate 20. Two or more diffractive optical elements 590 of the carousel 600' could be used to define perforations throughout a common region of the substrate 20.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A perforation system, comprising:
a laser system comprising a laser, a beam expander, a beam homogenizer, and an optical beamlet generator, wherein said beam expander is configured to expand a beam radius of the laser, wherein said optical beamlet generator is configured to output a plurality of beamlets from a laser beam, the optical beamlet generator is configured to receive the laser beam from the beam homogenizer; and
a scanner configured to simultaneously direct said plurality of beamlets from said optical beamlet generator toward a substrate and to simultaneously move said plurality of beamlets relative to the substrate in a first dimension and second dimension that are orthogonal to one another, wherein each beamlet of said plurality of beamlets simultaneously produces a two-dimensional perforation on a surface of the substrate by operation of said scanner, and wherein an optical path extends from said laser to the substrate, the laser impacting a surface the substrate in a plurality of row sets that extend in the first dimension wherein each row within a row set of the plurality of row sets is spaced from each other row within the row set a first distance in the second dimension, wherein each row in the row set is adjacent another row within the row set, and wherein each row set within the plurality of row sets is spaced from each other row set of the plurality of row sets a second distance in the second dimension, the second distance being greater than the first distance;
wherein the scanner comprises a first movable mirror and a second movable mirror, the second movable mirror is located between the first movable mirror and the substrate along said optical path;
wherein the beam expander is located between said laser and said optical beamlet generator proceeding along said optical path;
the beam homogenizer is located between said beam expander and said optical beamlet generator proceeding along said optical path; and
said optical beamlet generator is located between said beam homogenizer and said scanner proceeding along said optical path.

2. The perforation system of claim 1, wherein said first movable mirror controls an impact location of said plurality of beamlets on the substrate in said first dimension, and said second movable mirror controls said impact location of said plurality of beamlets on the substrate in said second dimension.

3. The perforation system of claim 1, further comprising:
a movable base, wherein said movable base comprises a plurality of said optical beamlet generators, wherein each said optical beamlet generator is separately movable into alignment with said optical path by movement of said movable base, and wherein at least some of said optical beamlet generators are of a different configuration.

4. The perforation system of claim 1, wherein said optical beamlet generator comprises a lenslet array, wherein said lenslet array comprises a plurality of lenslets, and wherein said lenslet array generates and outputs said plurality of beamlets.

5. The perforation system of claim 4, further comprising:
a movable base, wherein said movable base comprises a plurality of said lenslet arrays, wherein each said lenslet array is separately movable into alignment with said optical path by movement of said movable base, and wherein at least some of said lenslet arrays are of a different configuration, and wherein each said lenslet array comprises at least one lenslet.

6. The perforation system of claim 5, wherein each said lenslet array utilizes at least one of a different number of said at least one lenslet and a different arrangement of said at least one lenslet compared to each other said lenslet array.

7. The perforation system of claim 5, wherein at least one of said lenslet arrays is detachably connected with said movable base.

8. The perforation system of claim 1, wherein said optical beamlet generator comprises a diffractive optical element, and wherein said diffractive optical element generates and outputs said plurality of beamlets.

9. The perforation system of claim 8, further comprising:
a movable base, wherein said movable base comprises a plurality of said diffractive optical elements, wherein each said diffractive optical element is separately movable into alignment with said optical path by movement of said movable base, and wherein at least some of said diffractive optical elements are of a different configuration to provide at least one difference in relation to said plurality of beamlets that are output from a corresponding said diffractive optical element.

10. The perforation system of claim 9, wherein at least one of said diffractive optical elements is detachably connected with said movable base.

11. A method of forming a perforation on a substrate, comprising:
performing a generating step by generating a plurality of beamlets from a laser beam using a laser system, the laser system comprising a laser, a beam expander, a beam homogenizer, and a first optical beamlet generator;
directing said plurality of beamlets to a scanner;
performing an operating step by operating said scanner to simultaneously contact said plurality of beamlets with said substrate at a plurality of different locations on said substrate within a first dimension and in a second dimension that is orthogonal to said first dimension, the plurality of beamlets contacting the substrate in a plurality of row sets that extend in the first dimension wherein each row within a row set of the plurality of row sets is spaced from each other row within the row set a first distance in the second dimension, wherein each row in the row set is adjacent another row within the row set, and wherein each row set within the plurality of row sets is spaced from each other row set of the plurality of row sets a second distance in the second dimension, the second distance being greater than the first distance; and
forming a plurality of perforations on said substrate using said operating step;
wherein an optical path extends from said laser to the substrate;
wherein the scanner comprises a first movable mirror and a second movable mirror, the second movable mirror is located between the first movable mirror and the substrate along said optical path;
the beam expander is located between said laser and said first optical beamlet generator proceeding along said optical path, the beam expander configured to expand a beam radius of the laser;
the beam homogenizer is located between said beam expander and said first optical beamlet generator proceeding along said optical path;
the first optical beamlet generator is located between said beam homogenizer and said scanner proceeding along said optical path; and
the optical beamlet generator is configured to receive the laser beam from the beam homogenizer.

12. The method of claim 11, wherein said generating step comprises directing said laser beam to a lenslet array, wherein the first optical beamlet generator comprises the lenslet array.

13. The perforation system of claim 12, wherein said lenslet array comprises a plurality of lenslets, and wherein each lenslet outputs a corresponding beamlet.

14. The method of claim 11, wherein said generating step comprises directing said laser beam to a diffractive optical element.

15. The method of claim 11, wherein each beamlet produces a different perforation on said substrate from said operating step.

16. The method of claim 11, wherein a base comprises a plurality of optical beamlet generators, the plurality of optical beamlet generators includes the first optical beamlet generator, said method further comprising:
moving said base to dispose the first optical beamlet generator of said base in the optical path of said laser beam, wherein said generating step comprises directing said laser beam through said first optical beamlet generator.

17. The method of claim 16, where said generating step comprises using said first optical beamlet generator to form a first plurality of perforations on a first region of said substrate by said operating step.

18. The method of claim 17, further comprising:
moving said base to dispose a second optical beamlet generator of said base in said optical path of said laser beam, wherein said generating step comprises directing said laser beam through said second optical beamlet generator to form a second plurality of perforations in the same said first region of said substrate by said operating step.

19. The method of claim 17, further comprising:
moving said base to dispose a second optical beamlet generator of said base in said optical path of said laser beam, wherein said generating step comprises directing said laser beam through said second optical beamlet generator to form a second plurality of perforations outside of said first region of said substrate by said operating step.

20. The perforation system of claim 1, wherein the first movable mirror is a polygonal mirror rotatable about a rotational axis.

* * * * *